(12) United States Patent
Shin et al.

(10) Patent No.: US 11,887,417 B2
(45) Date of Patent: *Jan. 30, 2024

(54) ACCESS CONTROL SYSTEM AND ACCESS CONTROL METHOD USING THE SAME

(71) Applicant: MOCA SYSTEM INC., Seongnam-si (KR)

(72) Inventors: Dong Mok Shin, Seoul (KR); In Sik Baek, Seoul (KR); Jong Keun Lee, Seongnam-si (KR); Jung Young Kim, Yongin-si (KR); Seong Bin Choi, Seongnam-si (KR); Jae Won Lee, Seongnam-si (KR)

(73) Assignee: MOCA SYSTEM INC., Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/939,827

(22) Filed: Sep. 7, 2022

(65) Prior Publication Data

US 2023/0005310 A1 Jan. 5, 2023

Related U.S. Application Data

(63) Continuation of application No. 16/930,284, filed on Jul. 15, 2020, now Pat. No. 11,462,063, which is a (Continued)

(30) Foreign Application Priority Data

Mar. 6, 2018 (KR) .................. 10-2018-0026202
Mar. 6, 2018 (KR) .................. 10-2018-0026203

(51) Int. Cl.
*G07C 9/00* (2020.01)
*H04L 67/12* (2022.01)
*H04L 69/08* (2022.01)

(52) U.S. Cl.
CPC ..... *G07C 9/00182* (2013.01); *G07C 9/00563* (2013.01); *G07C 9/00571* (2013.01);
(Continued)

(58) Field of Classification Search
CPC ......... H04L 29/06; H04L 29/08; H04L 67/12; H04L 69/08; G07C 9/00182;
(Continued)

(56) References Cited

U.S. PATENT DOCUMENTS 8,264,322 B2   9/2012   Rodenbeck et al.
8,319,606 B2   11/2012  McGeachie
(Continued)

FOREIGN PATENT DOCUMENTS

KR   10-2010-0116994 A   11/2010
KR   10-1278974 B1       7/2013
(Continued)

OTHER PUBLICATIONS

KR Office Action dated Mar. 31, 2020 as received in Application No. 10-2018-0026202.
(Continued)

*Primary Examiner* — Nam V Nguyen
(74) *Attorney, Agent, or Firm* — Maschoff Brennan

(57) ABSTRACT

A sub-reader and a method of controlling the sub-reader are provided. The method of controlling the sub-reader which is connected to a door reader provided in an existing installed door operating device to provide a communication method that is not supported by the door reader includes: obtaining first open request information using a first communication method from a terminal; obtaining second open request information for transmission to the door reader based on the first open request information; and transmitting the second
(Continued)

open request information to the door reader using a second communication method different from the first communication method.

22 Claims, 21 Drawing Sheets

Related U.S. Application Data continuation of application No. 16/137,380, filed on Sep. 20, 2018, now Pat. No. 10,755,500.

(60) Provisional application No. 62/582,070, filed on Nov. 6, 2017.

(52) U.S. Cl.
CPC .......... G07C 9/00904 (2013.01); H04L 67/12 (2013.01); H04L 69/08 (2013.01)

(58) Field of Classification Search
CPC ............ G07C 9/00563; G07C 9/00571; G07C 9/00904; G07C 9/00
USPC .......................................... 340/5.2, 5.7, 5.28
See application file for complete search history.

(56) References Cited

U.S. PATENT DOCUMENTS

| | | | |
|---|---|---|---|
| 9,021,563 B2 | 4/2015 | Ying et al. | |
| 9,076,273 B2 | 7/2015 | Smith et al. | |
| 9,292,985 B2 | 3/2016 | Ahearn et al. | |
| 9,348,607 B2 | 5/2016 | Chaudhri et al. | |
| 9,396,598 B2 | 7/2016 | Daniel-Wayman et al. | |
| 9,558,604 B2 | 1/2017 | Robertson et al. | |
| 9,591,693 B2 | 3/2017 | Stroud | |
| 9,613,226 B2 | 4/2017 | Khassanov et al. | |
| 9,710,978 B1 * | 7/2017 | Sequeira | G07C 9/00896 |
| 9,761,074 B2 | 9/2017 | Cheng et al. | |
| 9,767,632 B2 * | 9/2017 | Johnson | G06F 3/04847 |
| 9,842,446 B2 * | 12/2017 | Vecchiotti | G07C 9/20 |
| 9,948,479 B2 | 4/2018 | Bunker et al. | |
| 10,083,559 B2 | 9/2018 | Schoenfelder et al. | |
| 10,192,383 B2 | 1/2019 | Aase | |
| 10,257,190 B2 | 4/2019 | Baty et al. | |
| 10,755,500 B2 * | 8/2020 | Shin | G07C 9/00182 |
| 11,462,063 B2 * | 10/2022 | Shin | G07C 9/00563 |
| 2006/0170533 A1 | 8/2006 | Chioiu et al. | |
| 2007/0043954 A1 | 2/2007 | Fox | |
| 2007/0180263 A1 | 8/2007 | Delgrosso et al. | |
| 2008/0246583 A1 | 10/2008 | Blake et al. | |
| 2010/0201536 A1 * | 8/2010 | Robertson | G07C 9/00904 340/5.61 |
| 2012/0075057 A1 * | 3/2012 | Fyke | G07C 9/00904 340/5.3 |
| 2012/0280783 A1 | 11/2012 | Gerhardt et al. | |
| 2012/0280790 A1 | 11/2012 | Gerhardt et al. | |
| 2013/0214899 A1 | 8/2013 | Herscovitch et al. | |
| 2013/0249670 A1 | 9/2013 | Lee | |
| 2014/0062656 A1 | 3/2014 | Bowen et al. | |
| 2014/0219453 A1 | 8/2014 | Neafsey et al. | |
| 2014/0320261 A1 * | 10/2014 | Davis | G07C 9/20 340/5.61 |
| 2017/0076523 A1 | 3/2017 | Rumble et al. | |
| 2017/0228953 A1 | 8/2017 | Lupovici | |

FOREIGN PATENT DOCUMENTS

| | | |
|---|---|---|
| KR | 10-1315940 B1 | 10/2013 |
| KR | 10-2014-0019800 A | 2/2014 |
| KR | 10-2014-0022217 A | 2/2014 |
| KR | 10-1465201 B1 | 11/2014 |
| KR | 10-2016-0022217 A | 2/2016 |
| KR | 10-2016-0024206 A | 3/2016 |

OTHER PUBLICATIONS

KR Decision to Grant dated May 21, 2023 as received in Application No. 10-2022-0126431.

* cited by examiner

ACCESS CONTROL SYSTEM AND ACCESS CONTROL METHOD USING THE SAME

CROSS-REFERENCE TO RELATED APPLICATION

This application is a continuation of U.S. patent application Ser. No. 16/930,284 filed on Jul. 15, 2020, now U.S. Pat. No. 11,462,063, issued on Oct. 4, 2022; which is continuation of U.S. patent application Ser. No. 16/137,380, filed on Sep. 20, 2018, now U.S. Pat. No. 10,755,500, issued on Aug. 25, 2020; which claims priority to and the benefit of U.S. Provisional Application No. 62/582,070, filed on Nov. 6, 2017, Korean Patent Application No. 10-2018-0026202, filed on Mar. 6, 2018 and Korean Patent Application No. 10-2018-0026203, filed on Mar. 6, 2018, the disclosure of which are incorporated herein by reference in their entireties.

BACKGROUND

1. Field of the Invention

The present invention relates to a sub-reader and a method of controlling the sub-reader.

2. Discussion of Related Art

Conventionally, access control methods using a magnetic-based card have been used. However, with the development of communication technology, an access control method using a variety of terminals that support various communication methods, such as Bluetooth and radio frequency identification (RFID), has been recently provided.

In the case of old buildings and particularly hotels, where conventional magnetic-based access control methods have primarily been used, previously installed need to be replaced with new door operating devices that support different communication methods in order to switch such conventional access control methods to other access control methods that use the different communication methods such as Bluetooth or RFID.

In addition, when the previously installed door operating devices are replaced, there is a problem in that a considerable amount of time and cost is required for construction, thereby making it difficult to replace the previously installed door operating devices in large-scale buildings or hotels.

SUMMARY OF THE INVENTION

One objective of the present invention is to provide a sub-reader and a method of controlling the sub-reader which allow access control using a communication method which is not supported by an existing installed door operating device, without replacing the existing installed door operating device.

Another objective of the present invention is to provide a sub-reader and a method of controlling the sub-reader which allow access control using an authentication method that is not supported by an existing installed door operating device, without replacing the existing installed door operating device.

Technical solutions of the present invention may not be limited to the above, and other technical solutions of the present invention will be clearly understandable to those having ordinary skill in the art from the disclosures provided below together with accompanying drawings.

In one general aspect, there is provided a method of controlling a sub-reader which is connected to a door reader provided in an existing installed door operating device to provide a communication method that is not supported by the door reader, the method including: obtaining first door-open request information using a first communication method from a terminal; obtaining second door-open request information to be transmitted to the door reader based on the first door-open request information; and transmitting the second door-open request information to the door reader using a second communication method that is different from the first communication method.

In another general aspect, there is provided a non-transitory recording medium on which a program is recorded for executing the above-described method.

In still another general aspect, there is provided a sub-reader which is connected to a door reader provided in an existing installed door operating device to provide a communication method which is not supported by the door reader, the sub-reader including: a first communication unit configured to obtain first door-open request information using a first communication method that is different from a second communication method provided by the door reader; a second communication unit configured to provide second door-open request information to the door reader using the second communication method; and a controller configured to obtain the second door-open request information, which is to be transmitted to the door reader using the second communication method, on the basis of the first door-open request information obtained by the first communication method.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
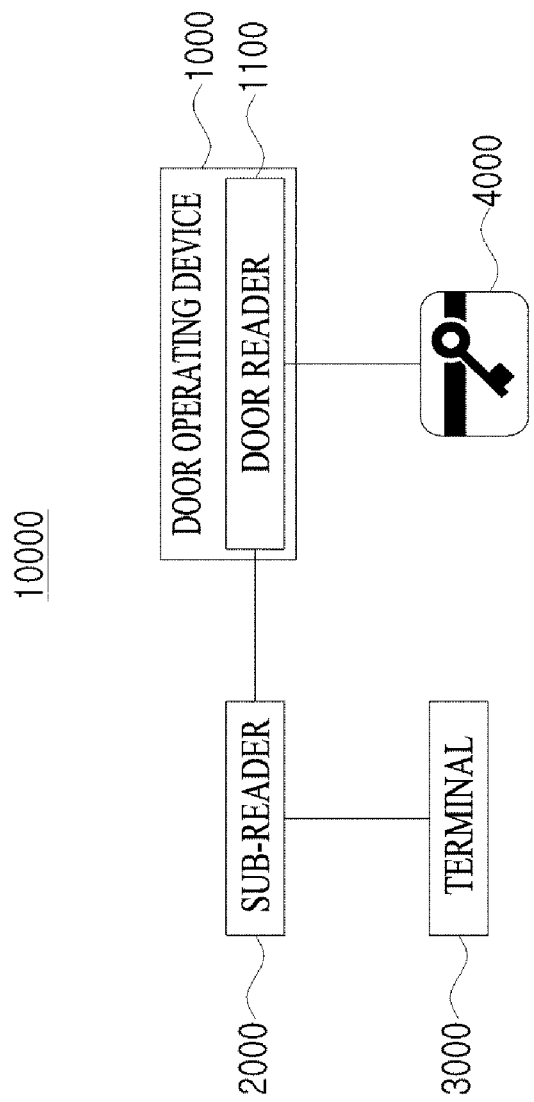
FIG. 1 is an environmental diagram illustrating an access control system according to one embodiment of the present invention.

The aforementioned purpose, characteristics, and advantages of the present invention will now be described more fully with reference to the accompanying drawings. The present invention may, however, be embodied in many different forms and in what follows, particular embodiments of the present invention are illustrated in the accompanying drawings and described in detail.

In the drawings, the thicknesses of layers and regions are exaggerated for clarity. It will also be understood that when an element or a layer is referred to as being "on" another element or layer, it can be directly on another element or layer, or intervening layers may also be present. Basically, like reference numerals across the document represent like components. Further, like reference numerals will be used to designate like components having similar functions throughout the drawings within the scope of the present invention.

In addition, when it is determined that disclosure related to the present invention or a specific description about structure of the present invention may lead to misunderstanding of the purpose of the present invention, the corresponding specific description would be omitted. Also, numerals employed for the description of the present invention (e.g., a first, a second, etc.) are introduced only to distinguish one component from another component.

In addition, in the following description, words "module" and "unit" for describing elements are used only in consideration of facilitating description and do not have meanings or functions discriminated from each other.

According to one embodiment, there is provided a method of controlling a sub-reader which is connected to a door reader provided in an existing installed door operating device to provide a communication method that is not supported by the door reader, the method including: obtaining first door-open request information using a first communication method from a terminal; obtaining second door-open request information to be transmitted to the door reader based on the first door-open request information; and transmitting the second door-open request information to the door reader using a second communication method that is different from the first communication method.

The obtaining of the second door-open request information may include obtaining the second door-open request information in a second data format corresponding to the second communication method, which is converted from the first door-open request information in a first data format corresponding to the first communication method.

The first door-open request information and the second door-open request information may include detailed information, and the detailed information included in the first door-open request information may be the same as the detailed information included in the second door-open request information.

The detailed information may include at least one of user identification information, terminal identification information, authentication information, and door security information.

The obtaining of the second door-open request information may further include performing user authentication based on the first door-open request information and obtaining the second door-open request information when an authentication result indicates that a user is a valid user.

The second door-open request information may include a result of the user authentication.

The method may further include requesting user authentication of a user corresponding to the first door-open request information by transmitting the first door-open request information to a server device.

The method may further include obtaining the second door-open request information when a user authentication result obtained from the server device indicates that the user is a valid user.

The method may further include, when the terminal requests the server device to perform user authentication, obtaining the first door-open request information when the requested user authentication result obtained from the server device indicates that the user is a valid user.

The obtaining of the second door-open request information may include performing user authentication of a user based on the first door-open request information and obtaining the second door-open request information including pre-stored door security information when the user authentication result indicates that the user is a valid user.

According to another embodiment, there is provided a non-transitory recording medium on which a program is recorded for executing the above-described method.

According to still another embodiment, there is provided a sub-reader which is connected to a door reader provided in an existing installed door operating device to provide a communication method which is not supported by the door reader, the sub-reader including: a first communication unit configured to obtain first door-open request information using a first communication method that is different from a second communication method provided by the door reader; a second communication unit configured to provide second door-open request information to the door reader using the second communication method; and a controller configured to obtain the second door-open request information, which is to be transmitted to the door reader using the second communication method, on the basis of the first door-open request information obtained by the first communication method.

Power required for operation of the sub-reader may be obtained from at least one of a radio frequency (RF) signal transmitted from the door reader and light provided from outside.

1. First Embodiment: Operation of Sub-Reader

FIG. 1 is an environmental diagram illustrating an access control system 10000 according to one embodiment of the present invention.

Referring to FIG. 1, the access control system 10000 according to one embodiment of the present invention may include a door operating device 1000, a sub-reader 2000, a terminal 3000, and a door key 4000.

The door operating device 1000 may control opening or closing of a door (not shown).

For example, the door operating device 1000 may be installed on the door to control locking or unlocking of the door. The door operating device 1000 may not necessarily be installed on the door and may optionally be provided in various forms. For example, the door operating device 1000 may be installed on a wall adjacent to the door and may provide an obstacle to the door or remove the obstacle therefrom. In addition, when the door is an automatic door, the door operating device 1000 may open or close the door by changing a position of a door leaf.

The door operating device 1000 may include a door reader 1100 to obtain information, which is necessary to determine whether to open the door, from the door key 4000.

The door operating device 1000 may be connected to the sub-reader 2000.

According to one embodiment, the connection between the door operating device 1000 and the sub-reader 2000 may be implemented by connecting the door reader 1100 and the sub-reader 2000.

The sub-reader 2000 may be configured to add a communication scheme, other than a communication scheme supported by the door reader 1100 which is pre-installed and is provided to the door operating device 1000.

The sub-reader 2000 may be connected to the door operating device 1000.

According to one embodiment, the sub-reader 2000 may be connected to the door reader 1100 included in the door operating device 1000.

The sub-reader 2000 may be connected to the door reader 1100 to transmit and/or receive data therebetween.

According to one embodiment, the sub-reader 2000 may acquire power required for operation using energy harvesting.

According to one embodiment, the sub-reader 2000 may acquire power required for operation using high frequency wireless power harvesting. The high frequency wireless power harvesting may refer to collecting power from a wireless signal necessary for high frequency communication used in communications.

For example, the sub-reader 2000 may acquire the power required for operation using a RF signal transmitted from the door reader 1100.

According to one embodiment, the sub-reader may acquire power required for operation from external light.

For example, the sub-reader 2000 may include a light conversion module (not shown) that converts external light into an electric signal, and may acquire an electric signal obtained through the light conversion module as the power required for operation.

In addition, according to one embodiment, the sub-reader 2000 may include a battery that pre-stores the power required for operation. The sub-reader 2000 may store the power obtained by energy harvesting in the battery.

Moreover, according to one embodiment, the sub-reader 2000 may not be provided with a battery and may be operated using power acquired by energy harvesting.

The terminal 3000 may be an electronic device connected to the sub-reader 2000.

According to one embodiment, the terminal 3000 may be connected to the sub-reader 2000 to transmit first door-open request information to the sub-reader 2000.

The first door-open request information may be information provided by a user and/or a user terminal to the sub-reader 2000 in order to request the sub-reader 2000 to open the door.

According to one embodiment, the first door-open request information may include detailed information including at least one of user identification information, terminal identification information, authentication information, and door security information.

The authentication information may be information used to determine whether the user and/or the user terminal are valid. For example, the authentication information may be an authentication token, biometric information, a password, or the like.

The authentication token may include at least one of authority information indicating an authority granted to the user and/or the terminal, validity conditions, issuer information, and receiver information.

In addition, according to one embodiment, the terminal 3000 may request user authentication to a server device 5000 and obtain a user authentication result.

In the present invention, the user authentication may include at least one of authentication of the user to determine whether the user is a valid user and authentication of the terminal used by the user.

The terminal 3000 may be, for example, an electronic device such as a smartphone, a tablet computer, a personal digital assistant (PDA), a notebook computer, or a wearable device.

Also, the terminal 3000 may provide a communication method different from that of the door key 4000 described below. The communication method of the terminal 3000 and the communication method of the door key 4000 are not necessarily different from each other, and the terminal 3000 may support the communication method of the door key 4000 and may be implemented to further support another communication method that is not provided by the door key 4000.

The door key 4000 may be connected to the door operating device 1000.

According to one embodiment, the door key 4000 may be connected to the door reader 1100 provided to the door operating device 1000.

The door key 4000 may be, for example, a smart card, an integrated circuit (IC) card, a magnetic stripe card, or an RF card.

The door key 4000 may pre-store at least one piece of data for requesting the door operating device 1000 to open the door and data necessary for opening the door.

For example, data necessary for opening the door may be recorded in the door key 4000 in a magnetic manner.

The door key 4000 according to one embodiment may store door security information necessary for opening the door.

The door security information may include at least one of door key identification information, door identification information, a door password, open command information, and authentication information.

A door key identification number may be an identification number previously assigned to the door key and/or an identification number pre-stored in the door key.

The door identification information may be identification information for the door and/or the door operating device 1000.

The open command information may be data about a door open command for the door operating device 1000.

The door key 4000 may be connected to the door operating device 1000 to provide the door security information. Here, the connection between the door key 4000 and the door operating device 1000 may indicate that the door operating device 1000 acquires data from the door key 4000 directly or indirectly. For example, in a case where the door key 4000 is provided as a magnetic stripe card, when the door key 4000 is connected to the door operating device 1000 and provides the door security information, the door operating device 1000 may obtain the door security information recorded in a magnetic stripe.

Figure 2:
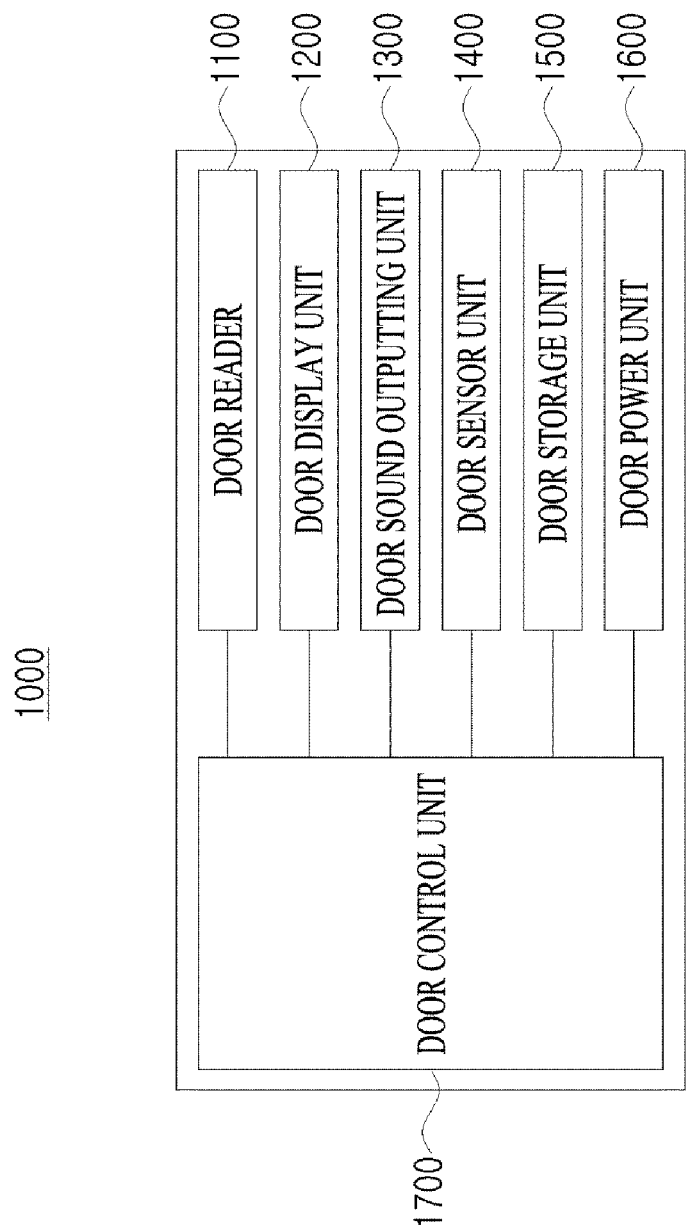
FIG. 2 is a block diagram illustrating a door operating device according to one embodiment.

FIG. 2 is a block diagram illustrating a door operating device 1000 according to one embodiment.

Referring to FIG. 2, the door operating device 1000 may include a door reader 1100, a door display unit 1200, a door sound outputting unit 1300, a door sensor unit 1400, a door storage unit 1500, a door power unit 1600, and a door control unit 1700.

The door reader 1100 may be a communication module capable of acquiring data from a door key 4000.

The door reader 1100 according to one embodiment may obtain data from the door key 4000 using a magnetic method, a contact method, a non-contact method, or an RF method.

In addition, the door reader 1100 may be implemented as a reader, such as an RF reader, an IC reader, or a magnetic reader, which can read information from an external electronic device.

In addition, according to one embodiment, the door reader 1100 may be connected to a sub-reader 2000.

Also, according to one embodiment, the door reader 1100 may obtain data from the sub-reader 2000.

The door display unit 1200 may output visual information.

The door display unit 1200 may output information to be visually provided to a user. When the door display unit 1200 includes a touch panel, the door display unit 1200 may operate as a touch input-based input device.

The door sound outputting unit 1300 may output information to be acoustically provided to the user.

For example, the door sound outputting unit 1300 may be a speaker or a buzzer used to output a sound.

The door sensor unit 1400 may obtain a signal related to an external environment required for the door operating device 1000. For example, the door sensor unit 1400 may obtain a signal related to a distance between the user and an object or the like. In another example, the door sensor unit 1400 may obtain a signal required for identifying a position of a door leaf.

The door storage unit 1500 may store a program for executing a control operation of the door control unit 1700 and may store data received from an external device and data generated by the door control unit 1700.

The door power unit 1600 may supply power required for locking or unlocking door leaves. In addition, when the door is implemented as an automatic door, the door power unit 1600 may provide power required for opening or closing the door leaves.

The door control unit 1700 may control overall operations of the door operating device 1000.

The door control unit 1700 may control some elements included in the door operating device 1000. In addition, the door control unit 1700 may obtain a signal from some elements included in the door operating device 1000. Additionally, the door control unit 1700 may determine whether to open or close the door based on data obtained through the door reader 1100. Moreover, the door control unit 1700 may control the opening and/or closing of the door based on the determination of whether the door is to be opened or closed.

Figure 3:
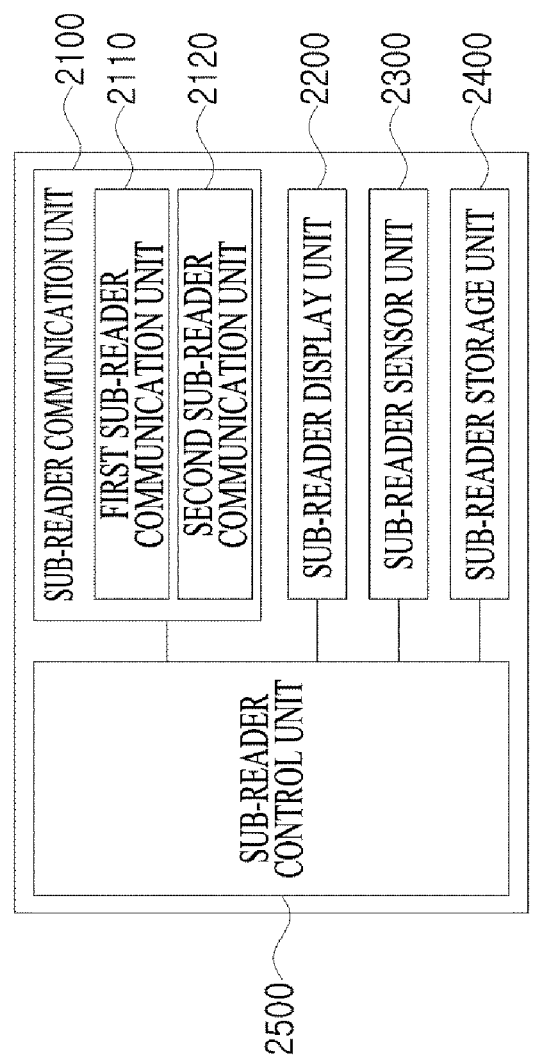
FIG. 3 is a block diagram illustrating a sub-reader according to one embodiment.

FIG. 3 is a block diagram illustrating a sub-reader 2000 according to one embodiment.

Referring to FIG. 3, the sub-reader 2000 may include a sub-reader communication unit 2100, a sub-reader display unit 2200, a sub-reader sensor unit 2300, a sub-reader storage unit 2400, and a sub-reader control unit 2500.

The sub-reader communication unit 2100 may be connected to a door operating device 1000 and a terminal 3000.

When the sub-reader communication unit 2100 according to one embodiment is connected to the door operating device 1000, the sub-reader communication unit 2100 may be connected to the door reader 1100 included in the door operating device 1000.

Also, the sub-reader communication unit 2100 according to one embodiment may be connected to the terminal 3000.

The sub-reader communication unit 2100 according to one embodiment may provide at least one communication method that is not supported by the door reader 1100.

The sub-reader communication unit 2100 may include a first sub-reader communication unit 2120 connected to the terminal 3000 and a second sub-reader communication unit 2120 connected to the door reader 1100.

According to one embodiment, the first sub-reader communication unit 2110 may obtain data from the terminal 3000 and the second sub-reader communication unit 2120 may provide data to the door reader 1100.

According to one embodiment, a communication method by which the first sub-reader communication unit 2110 communicates with the terminal 3000 may be different from a communication method by which the second sub-reader communication unit 2120 communicates with the door reader 1100.

For example, the first sub-reader communication unit 2110 may communicate with the terminal 3000 through a Bluetooth communication method and the second sub-reader communication unit 2120 may communicate with the door reader 1100 through a magnetic communication method.

According to some embodiments of the present invention, the first sub-reader communication unit 2110 may support at least one communication method different from that supported by the second sub-reader communication unit 2120.

According to one embodiment, the first sub-reader communication unit 2110 may communicate with the terminal 3000 using a Bluetooth communication method to obtain data and the second sub-reader communication unit 2120 may provide data to the door reader 1100 using a magnetic communication method.

The sub-reader display unit 2200 may output visual information.

The sub-reader display unit 2200 may output information allowed to be visually provided to the user. When the sub-reader display unit 2200 includes a touch panel, the sub-reader display unit 2200 may operate as a touch input-based input device.

The sub-reader sensor unit 2300 may obtain first door-open request information from an external source.

The sub-reader sensor unit 2300 according to one embodiment may be provided as at least one of an image sensor, a biometric acquisition sensor, and a barcode reader.

The image sensor may be a sensor module used to obtain a signal corresponding to an external image.

The biometric acquisition sensor may be a sensor module used to obtain a signal related to biometric information about a fingerprint, a vein, an iris, a face, and the like.

The barcode reader may be a sensor module used to obtain information from code data generated from a one-dimensional barcode, a two-dimensional barcode, or the like.

The one-dimensional barcode may be a linear barcode. In addition, the two-dimensional barcode may be a barcode in a two-dimensional form, such as QR code, Aztec, Maxi-Code, data matrix, or the like.

The sub-reader storage unit 2400 may store a program for executing a control operation of the sub-reader control unit 2500 and store data received from an external source and data generated by the sub-reader control unit 2500.

The sub-reader control unit 2500 may control operations of some elements included in the sub-reader 2000. In addition, the sub-reader control unit 2500 may obtain signals from some elements included in the sub-reader 2000. Additionally, the sub-reader control unit 2500 may control operations for performing some steps performed by the sub-reader 2000 among steps in methods described below or perform an operation required for performing the steps.

Figure 4:
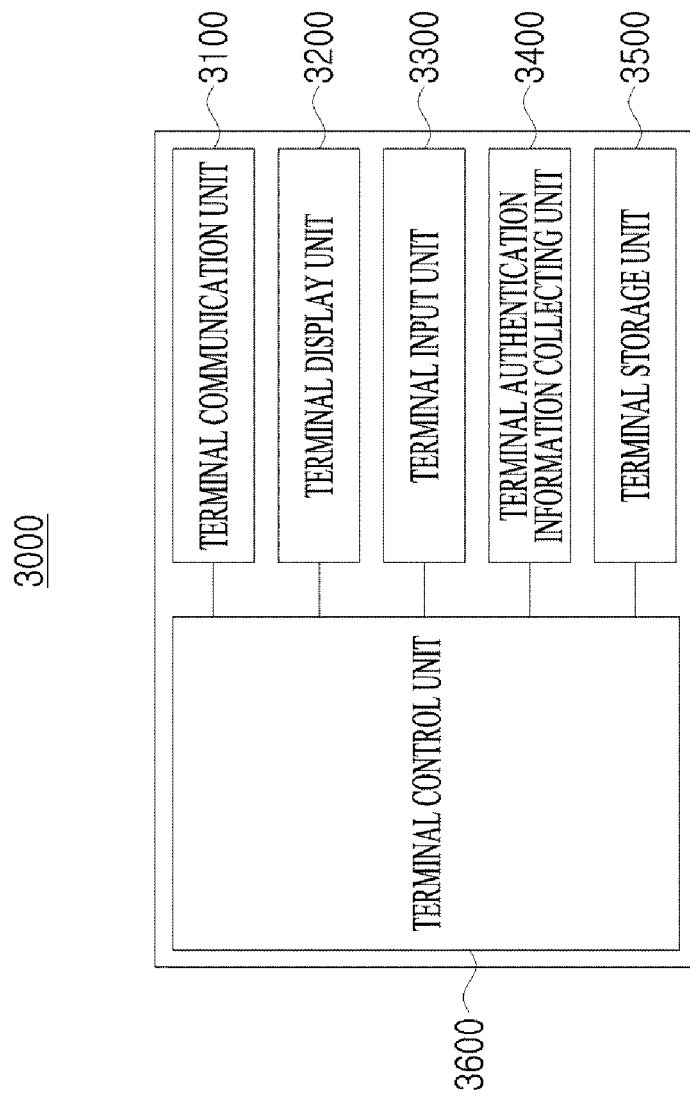
FIG. 4 is a block diagram illustrating a terminal according to one embodiment.

FIG. 4 is a block diagram illustrating a terminal 3000 according to one embodiment.

Referring to FIG. 4, the terminal 3000 may include a terminal communication unit 3100, a terminal display unit 3200, a terminal input unit 3300, a terminal authentication information collecting unit 3400, a terminal storage unit 3500, and a terminal control unit 3600.

The terminal communication unit 3100 may connect the terminal 3000 to an external electronic device. For example, the terminal communication unit 3100 may connect the terminal 3000 to an external electronic device such as a server device 5000 and a door operating device 1000. In addition, the terminal communication unit 3100 may be a communication module which supports wired and/or wireless communication.

The terminal display unit 3200 may output visual information.

When the terminal display unit 3200 is provided as a touch screen, the terminal display unit 3200 may perform a function of the terminal input unit 3300. In this case, a separate terminal input unit 3300 may not be optionally provided, and the terminal input unit 3300 for performing limited functions, such as volume control, power button, and home button, may be provided.

The terminal input unit 3300 may acquire a signal corresponding to a user's input.

The terminal input unit 3300 may be implemented as, for example, a keyboard, a keypad, a jog shuttle, a wheel, or the like.

In addition, the user's input may be, for example, pressing, touching, or dragging a button.

When the terminal display unit 3200 is implemented as a touch screen, the terminal display unit 3200 may perform a function of the terminal input unit 3300.

The terminal authentication information collecting unit 3400 may acquire authentication information from the user.

The terminal authentication information collecting unit 3400 may acquire authentication information used to authenticate the user and/or the user terminal 2000.

The authentication information may include information about at least one of a fingerprint, an iris, a vein, a face, and a gesture of the user.

The terminal authentication information collecting unit 3400 may collect information about the fingerprint, the iris, the vein, the face, and the gesture.

The terminal authentication information collecting unit 3400 may be implemented as a sensor module, a camera, or the like to acquire information about the fingerprint, the iris, the vein, the face, and the gesture.

The authentication information may include comparison authentication information, target authentication information, and reference authentication information.

The comparison authentication information may be authentication information which is pre-stored in an entity that performs authentication so as to be compared with the target authentication information.

The target authentication information which is authentication information provided by an object to be authenticated may be authentication information about a user who requests authentication.

The reference authentication information may be authentication information selected from pieces of comparison authentication information so as to be substantially used for authentication.

The terminal storage unit 3500 may store data.

The terminal storage unit 3500 may be implemented as, for example, a flash memory, a random access memory (RAM), a read-only memory (ROM), a solid-state drive (SSD), a secure digital (SD) card, an optical disk, or the like.

The terminal storage unit 3500 may store data necessary for operation of the terminal 3000.

The terminal control unit 3600 may control overall operations of the terminal 3000.

Figure 5:
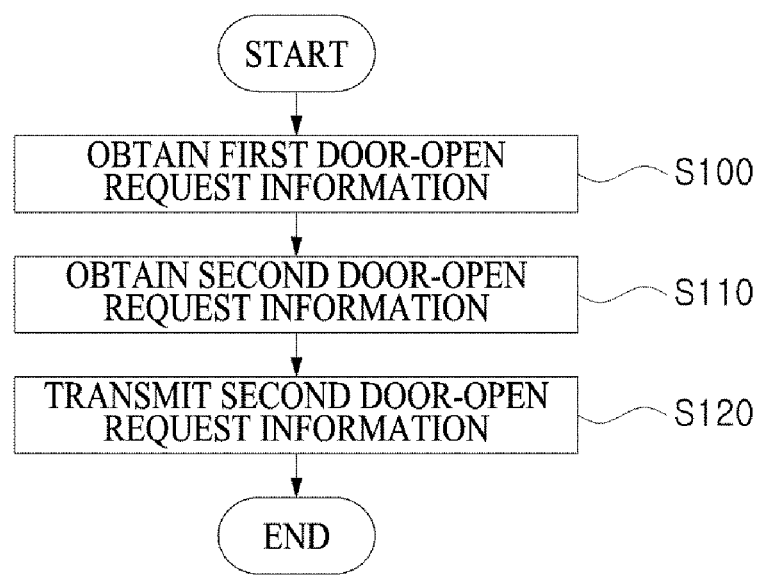
FIG. 5 is a flowchart illustrating an operation method of the sub-reader according to one embodiment of the present invention.

FIG. 5 is a flowchart illustrating an operation method of the sub-reader 2000 according to one embodiment of the present invention.

Referring to FIG. 5, the operation method of the sub-reader 2000 includes obtaining first door-open request information (S100), obtaining second door-open request information (S110), and transmitting the second door-open request information (S120).

According to one embodiment, the first door-open request information may be obtained (S100).

According to one embodiment, the sub-reader 2000 may obtain the first door-open request information from the terminal 3000.

The sub-reader 2000 may obtain the first door-open request information from the terminal 3000 through the first sub-reader communication unit 2110.

The sub-reader 2000 may obtain the first door-open request information in a first data format for a first communication method from the terminal 3000 through the first sub-reader communication unit 2110.

For example, when the first communication method is a Bluetooth communication method, the sub-reader 2000 may obtain the first door-open request information in a Bluetooth communication data format.

According to one embodiment, the sub-reader 2000 may obtain the first door-open request information from at least one of content output from the terminal display unit 3200 and content provided by a device or a medium other than the terminal 3000.

The terminal 3000 may output a barcode in which the first door-open request information is recorded through the terminal display unit 3200.

For example, the terminal 3000 may output an image of a QR code in which the first door-open request information is recorded through the terminal display unit 3200.

According to one embodiment, the sub-reader sensor unit 2300 may acquire QR code data from the image of the QR code output through a display unit of the terminal, and the sub-reader control unit 2500 may obtain the QR code data from the sub-reader sensor unit 2300 and acquire the first door-open request information on the basis of the QR code data.

Alternatively, according to one embodiment, the sub-reader sensor unit 2300 may obtain an image of the QR code output through the terminal display unit 3200 and provide the obtained image of the QR code to the sub-reader control unit 2500. The sub-reader control unit 2500 may acquire the QR code data from the obtained image of the QR code and acquire the first door-open request information on the basis of the QR code data.

According to one embodiment, the sub-reader control unit 2500 may acquire the QR code data from an image of the QR code printed on paper and acquire the first door-open request information on the basis of the acquired QR code data.

According to one embodiment, the sub-reader 2000 may acquire the first door-open request information on the basis of biometric information obtained from the user.

The sub-reader sensor unit 2300 may obtain biometric information of the user who requests opening of the door. The sub-reader sensor unit 2300 may provide the obtained biometric information to the sub-reader control unit 2500 and may obtain the biometric information as the first door-open request information.

According to one embodiment, the second door-open request information may be obtained (S110).

According to one embodiment, the sub-reader 2000 may acquire the second door-open request information on the basis of the first door-open request information.

On the basis of the first door-open request information, the sub-reader 2000 may acquire the second door-open request information in a data format different from a data format of the first door-open request information.

The second door-open request information may be information that the sub-reader 2000 provides to the door operating device 1000 to request opening of the door.

According to one embodiment, the sub-reader 2000 may obtain the first door-open request information in a first data format for a first communication method from the terminal 3000 through the first sub-reader communication unit 2110.

The sub-reader 2000 may obtain the second door-open request information in a second data format for a second communication method on the basis of the first door-open request information acquired in the first data format for the first communication method.

For example, the sub-reader 2000 may acquire the second door-open request information in a magnetic data format for a magnetic communication method on the basis of the first door-open request information acquired in a Bluetooth communication data format for a Bluetooth communication method.

According to one embodiment, the first door-open request information and the second door-open request information may have different data formats but include the same detailed information.

For example, when the first door-open request information contains door security information generated in a Bluetooth communication data format, the sub-reader 2000 may acquire the second door-open request information in a magnetic communication data format containing the door security information.

According to one embodiment, the sub-reader 2000 may perform user authentication on the basis of the detailed information included in the first door-open request information and acquire the second door-open request information when the user authentication result indicates that the user is a valid user.

The sub-reader 2000 may perform user authentication on the basis of the first door-open request information.

According to one embodiment, when reference authentication information corresponding to the authentication information included in the acquired first door-open request information has been pre-stored in the sub-reader storage unit 2400, the sub-reader 2000 may determine that the user is a valid user.

The reference authentication information may be authentication information that is pre-registered and stored for a valid user. For example, the reference authentication information may be biometric information of a valid user.

According to one embodiment, when an authentication token included in the first door-open request information holds authority for opening the door corresponding to the sub-reader 2000, and/or the door operating device 1000, the sub-reader 2000 may determine that the user is a valid user.

The sub-reader 2000 may acquire the second door-open request information when the user authentication result indicates that the user is a valid user.

When the user authentication result indicates that the user is a valid user, the sub-reader 2000 may acquire the second door-open request information in the second data format so that the second door-open request information may include detailed information which indicates that the user is a valid user. The detailed information indicating that the user is a valid user may not be limited to information that indicates that the user is determined to be a valid user by the user authentication, and may be replaced with information that requests opening of the door.

According to one embodiment, the sub-reader 2000 may acquire the second door-open request information on the basis of door security information, which is pre-stored on the basis of the first door-open request information.

When the first door-open request information only contains data necessary for user authentication, the sub-reader 2000 may perform user authentication on the basis of the first door-open request information and acquire the second door-open request information on the basis of door security information pre-stored in the sub-reader 2000 when the user authentication result indicates that the user is a valid user.

For example, when the first door-open request information obtained by the sub-reader 2000 is biometric information, the sub-reader 2000 may perform user authentication on the basis of the biometric information and obtain the door security information pre-stored in the sub-reader storage unit as the second door-open request information when the user authentication result indicates that the user is a valid user.

When the pre-stored door security information is formed in a data format different from the second data format, the sub-reader 2000 may acquire the second door-open request information by converting the security door information into the second data format.

According to one embodiment, the second door-open request information may be transmitted (S120).

The sub-reader 2000 may transmit the second door-open request information.

The sub-reader 2000 may provide the second door-open request information to the door reader 1100 through the second sub-reader communication unit 2120.

According to one embodiment, a communication method by which the second sub-reader communication unit 2120 transmits the second door-open request information to the door reader 1100 may be the same communication method as that used by the door reader 1100 to obtain the door security information through the door key 4000.

For example, the sub-reader 2000 may provide the second door-open request information to the door reader 1100 through a magnetic secure transmission method. Accordingly, when the door reader 1100 is a magnetic reader, the door reader 1100 may obtain the second door-open request information from the second sub-reader communication unit 2120 using a magnetic communication method.

The door reader 1100 may provide the obtained second door-open request information to the door control unit 1700 and the door control unit 1700 may determine whether to open or close the door when the door security information is obtained from the door key 4000, and may control the door to be opened or closed on the basis of the determined result.

Hereinafter, an access control system 10000' according to another embodiment of the present invention will be described with reference to FIGS. 6 to 9. The access control system 10000' according to another embodiment of the present invention may be implemented by adding a server device 5000 to the access control system 10000 according to one embodiment of the present invention. Thus, in describing the access control system 10000' according to another embodiment of the present invention, the same numerals represent the same or substantially the same elements as those of the access control system 10000 according to one embodiment of the present invention and detailed descriptions of the same elements will be omitted.

Figure 6:
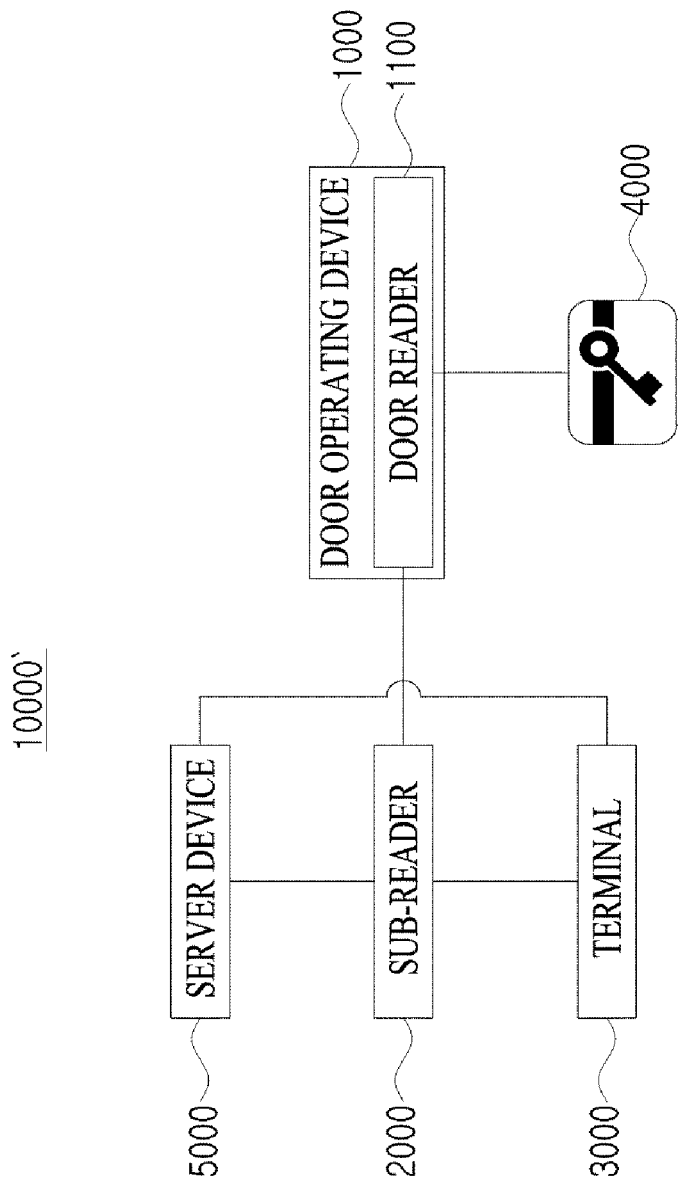
FIG. 6 is an environmental diagram illustrating an access control system according to another embodiment.

FIG. 6 is an environmental diagram illustrating an access control system 10000' according to another embodiment.

Referring to FIG. 6, the access control system 10000' according to another embodiment may include a door operating device 1000, a sub-reader 2000, a terminal 3000, and a server device 5000.

The door operating device 1000 may control opening or closing of a door.

For example, the door operating device 1000 may be installed on the door to control locking or unlocking of the door. The door operating device 1000 may not necessarily be installed on the door and may optionally be provided in various forms. For example, the door operating device 1000 may be installed on a wall adjacent to the door and may provide an obstacle to the door or remove the obstacle therefrom. In addition, when the door is an automatic door, the door operating device 1000 may open or close the door by changing a position of a door leaf.

The door operating device 1000 may include a door reader 1100 to acquire information, which is necessary to determine whether to open the door, from the door key 4000.

The door operating device 1000 may be connected to the sub-reader 2000.

The sub-reader 2000 may be connected to the door operating device 1000.

The sub-reader 2000 according to another embodiment may be connected to a door reader 1100 included in the door operating device 1000.

The sub-reader 2000 may be connected to the door reader 1100 to transmit and/or receive data therebetween.

In addition, the sub-reader 2000 may be connected to the terminal 3000 to transmit and/or receive data therebetween.

Additionally, the sub-reader 2000 may be connected to the server device 5000 to transmit and/or receive data therebetween.

The terminal 3000 may be an electronic device connected to the sub-reader 2000.

The terminal 3000 may be connected to the sub-reader 2000 and may transmit first door-open request information to the sub-reader 2000.

The terminal 3000 may be, for example, a smartphone, a tablet computer, a PDA, a notebook computer, or a wearable device.

In addition, the terminal 3000 may provide a communication method different from that of the door key 4000 described below.

Also, the terminal 3000 may be connected to the server device 5000 to transmit and/or receive data therebetween.

The server device 5000 may be connected to an external electronic device.

According to another embodiment, the server device 5000 may be connected to at least one of the sub-reader 2000 and the terminal 3000.

The server device 5000 may perform authentication in response to a request from at least one of the sub-reader 2000 and the terminal 3000.

According to another embodiment, the server device 5000 may perform authentication of a user of the terminal 3000. Alternatively, the server device 5000 may perform authentication of the terminal 3000 itself.

Figure 7:
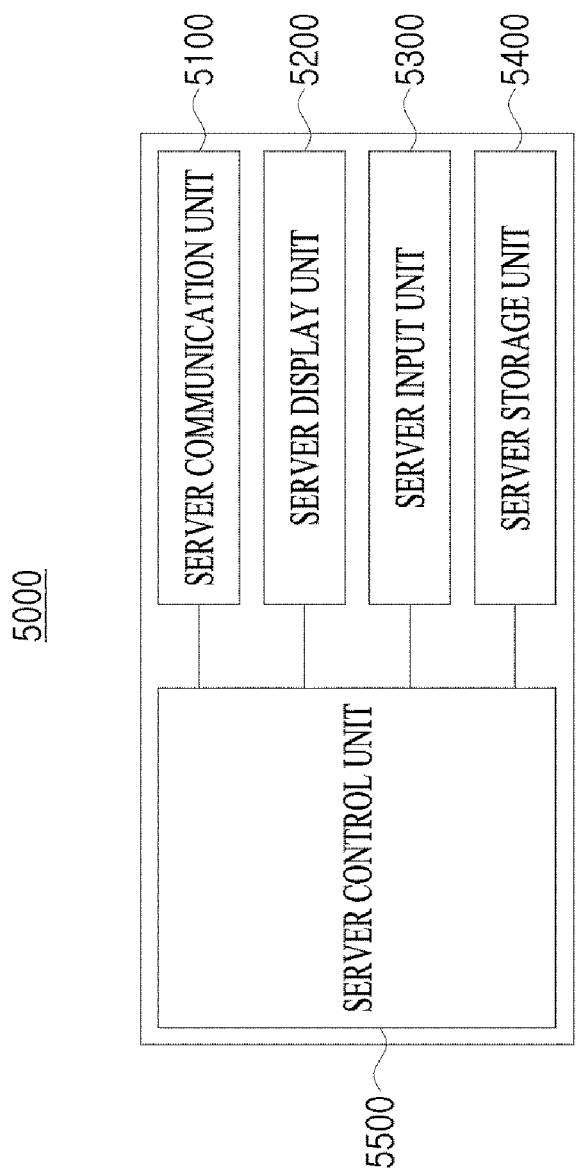
FIG. 7 is a block diagram illustrating a server device according to another embodiment of the present invention.

FIG. 7 is a block diagram illustrating a server device 5000 according to another embodiment of the present invention.

Referring to FIG. 7, the server device 5000 may include a server communication unit 5100, a server display unit 5200, a server input unit 5300, a server storage unit 5400, and a server control unit 5500.

The server communication unit 5100 may connect the server device 5000 and an external electronic device. That is, the server communication unit 5100 may transmit and/or receive data to and/or from the external electronic device. In addition, the server communication unit 5100 may maintain or disconnect the communication connection with the terminal 3000 as needed.

In addition, the server communication unit 5100 may be a communication module that supports at least one of a wired communication method and a wireless communication method.

The server display unit 5200 may output visual information.

For example, the server display unit 5200 may be a liquid crystal display (LCD), an organic light-emitting diode (OLED) display, an active-matrix organic light-emitting diode (AMOLED) display, or the like.

The server input unit 5300 may acquire an electric signal corresponding to a user input. For example, the server input unit 5300 may include a keypad, a keyboard, a switch, a button, a touch screen, and the like.

The server storage unit 5400 may store data therein.

For example, the server storage unit 5400 may store data acquired from the terminal 3000. In another example, the server storage unit 5400 may store a program necessary for operation of the server device 5000.

The server control unit 5500 may control overall operations of the server device 5000.

The server device 5000 according to another embodiment does not necessarily have to include all of the above-described components, and may be provided in a form in which some components are optionally omitted. For example, when the server device 5000 does not provide direct visual information, the server display unit 5200 may be omitted from the server device 5000. In addition, the server device 5000 may be provided in a form in which a component for performing an additional function and operation is optionally added.

Figure 8:
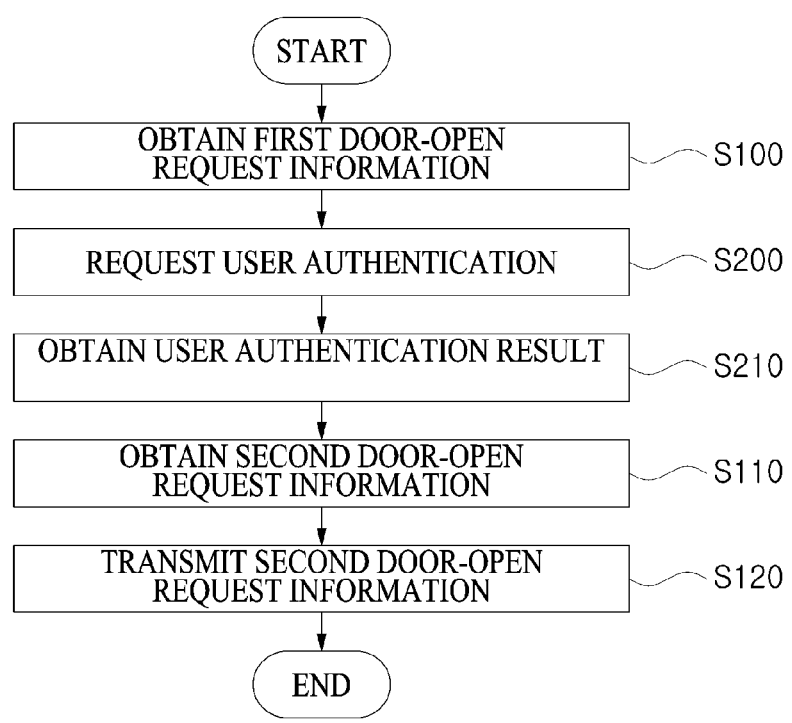
FIG. 8 is a flowchart illustrating an operation method of a sub-reader according to another embodiment of the present invention.

FIG. 8 is a flowchart illustrating an operation method of a sub-reader 2000 according to another embodiment of the present invention.

Referring to FIG. 8, the operation method of the sub-reader 2000 may include obtaining first door-open request information (S100), requesting user authentication (S200), obtaining a user authentication result (S210), obtaining second door-open request information (S110), and transmitting the second door-open request information (S120).

According to another embodiment, the first door-open request information may be obtained (S100).

The sub-reader 2000 may acquire the first door-open request information from the terminal 3000.

The sub-reader 2000 may obtain the first door-open request information from the terminal 3000 through the first sub-reader communication unit 2110.

The first door-open request information may be data that the terminal 3000 provides to the sub-reader 2000 to request opening of the door.

The first door-open request information according to another embodiment may include at least one of an authentication token, user authentication information, and door security information stored in the door key 4000.

The sub-reader 2000 may obtain the first door-open request information in a first data format for a first communication method from the terminal 3000 through the first sub-reader communication unit 2110.

For example, the sub-reader 2000 may acquire the first door-open request information in a Bluetooth communication data format.

According to another embodiment, the sub-reader 2000 may obtain the first door-open request information from at least one of content output from the terminal display unit 3200 and content provided by a device or a medium other than the terminal 3000.

According to another embodiment, the sub-reader sensor unit 2300 may acquire QR code data from an image of a QR code output through the terminal display unit 3200, and the sub-reader control unit 2500 may obtain the QR code data from the sub-reader sensor unit 2300 and obtain the first door-open request information on the basis of the QR code data.

Alternatively, according to another embodiment, the sub-reader sensor unit 2300 may obtain an image of a QR code output through the terminal display unit 3200 and provide the obtained image of the QR code to the sub-reader control unit 2500. The sub-reader control unit 2500 may acquire the QR code data from the obtained image of the QR code and acquire the first door-open request information on the basis of the QR code data.

According to another embodiment, the sub-reader control unit 2500 may acquire the QR code data from an image of the QR code printed on paper and acquire the first door-open request information on the basis of the acquired QR code data.

According to another embodiment, the sub-reader 2000 may acquire the first door-open request information on the basis of biometric information obtained from the user.

The sub-reader sensor unit 2300 may obtain biometric information of the user who requests opening of the door. The sub-reader sensor unit 2300 may provide the obtained biometric information to the sub-reader control unit 2500 and may obtain the biometric information as the first door-open request information.

According to another embodiment, user authentication may be requested (S200).

The sub-reader 2000 may transmit the obtained first door-open request information to the server device 5000.

The sub-reader 2000 may request the server device 5000 to perform user authentication on the basis of the first door-open request information.

The server device 5000 may obtain the first door-open request information from the sub-reader 2000.

The server device 5000 may perform user authentication on the basis of the first door-open request information.

The first door-open request information according to another embodiment may include detailed information including at least one of user identification information, terminal identification information, authentication token, user authentication information, and door security information.

According to another embodiment, the server device 5000 may determine that the user is a valid user when the detailed information included in the first door-open request information has been pre-stored.

According to another embodiment, when the authentication token included in the first door-open request information holds authority for opening the door corresponding to the sub-reader 2000, and/or the door operating device 1000, the server device 5000 may determine that the user is a valid user.

According to another embodiment, a user authentication result is obtained (S210).

The sub-reader 2000 may obtain a user authentication result from the server device 5000.

According to another embodiment, the sub-reader 2000 may acquire second door-open request information when the user authentication result indicates that the user is a valid user.

Alternatively, according to another embodiment, the sub-reader 2000 may output a message through the sub-reader display unit 2200 to indicate that the authentication has failed when the obtained user authentication result indicates that the user is not valid.

According to another embodiment, the second door-open request information may be obtained (S110).

The sub-reader 2000 may obtain the second door-open request information on the basis of at least one of the first door-open request information and the user authentication result obtained from the server device 5000.

According to another embodiment, the operation of obtaining the second door-open request information on the basis of the first door-open request information may be an operation of acquiring the second door-open request information in a data format different from a format of the first door-open request information, on the basis of the first door-open request information.

As described above, the sub-reader 2000 may obtain the first door-open request information in the first data format for the first communication method from the terminal 3000 through the first sub-reader communication unit 2110.

The sub-reader 2000 may obtain the second door-open request information in the second data format for the second communication method on the basis of the first door-open request information acquired in the first data format for the first communication method.

For example, the sub-reader 2000 may acquire the second door-open request information in a magnetic data format for a magnetic communication method on the basis of the first door-open request information acquired in a Bluetooth communication data format for a Bluetooth communication method.

In addition, according to another embodiment, the first door-open request information and the second door-open request information may have different data formats but include the same detailed information.

According to another embodiment, when the authentication result indicates that the user is a valid user, the sub-reader 2000 may obtain pre-stored door security information as the second door-open request information.

When the pre-stored door security information is formed in a data format different from the second data format, the sub-reader 2000 may acquire the second door-open request information by converting the security door information into the second data format.

According to another embodiment, the second door-open request information may be transmitted (S120).

The sub-reader 2000 may transmit the second door-open request information.

The sub-reader 2000 may provide the second door-open request information to the door reader 1100 through the second sub-reader communication unit 2120.

According to another embodiment, a communication method by which the second sub-reader communication unit 2120 transmits the second door-open request information to the door reader 1100 may be the same communication method as that used by the door reader 1100 to obtain the door security information through the door key 4000.

For example, the sub-reader 2000 may transmit the second door-open request information to the door reader 1100 using a magnetic communication method.

When the door operating device 1000 obtains the second door-open request information from the sub-reader 2000 through the door reader 1100, the door operating device 1000 may determine whether to open or close the door when the door security information is obtained from the door key 4000, and may open or close the door on the basis of the determined result.

Although in the above description, the sub-reader 2000 is described as requesting the user authentication to the server device 5000 on the basis of the first door-open request information, the present invention is not limited thereto and a modification in which the terminal 3000 requests the server device 5000 for user authentication and then provides the first door-open request information to the sub-reader 2000 may be possible.

Figure 9:
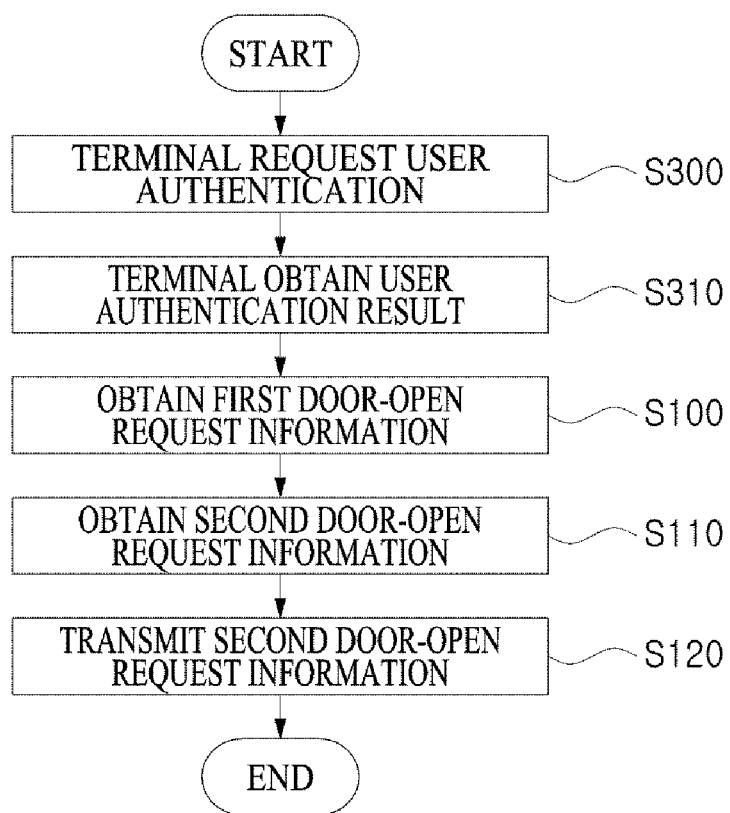
FIG. 9 is a flowchart illustrating a modification of the operation method of the sub-reader according to another embodiment.

FIG. 9 is a flowchart illustrating a modification of the operation method of the sub-reader 2000 according to another embodiment.

Referring to FIG. 9, the modification of the operation method of the sub-reader 2000 according to another embodiment may include requesting, by the terminal 3000, user authentication (S300), obtaining, by the terminal 3000, a user authentication result (S310), obtaining first door-open request information (S100), obtaining second door-open request information (S110), and transmitting the second door-open request information (S120).

According to another embodiment, the terminal 3000 may request user authentication (S300).

The terminal 3000 may request user authentication by transmitting user authentication information to the server device 5000.

The user authentication information may include at least one of user identification information, terminal identification information, and a password.

In addition, the terminal 3000 may request user authentication by transmitting access target identification information about an access target to enter and exit.

The access target identification information may be at least one of identification information of a door, identification information of the door operating device 1000 corresponding to the door, and identification information of the sub-reader 2000 corresponding to the door.

In addition, the terminal 3000 may request user authentication by further transmitting sub-authentication information obtained from the sub-reader 2000 at the time of requesting authentication.

According to another embodiment, the sub-reader 2000 may transmit pre-stored sub-authentication information to the terminal 3000. The sub-authentication information may include at least one of identification information assigned to the sub-reader 2000 and an encryption key pre-stored in the sub-reader 2000.

The server device 5000 may obtain at least one of the user authentication information and the access target identification information.

The server device 5000 may perform user authentication on the basis of the user authentication information.

According to another embodiment, the server device 5000 may determine that the user is a valid user when the user identification information obtained from the terminal 3000 has been pre-stored in the server device 5000.

According to another embodiment, the user may be determined to be a valid user when a password included in the user authentication information is the same as a stored password matched with the user identification information which is pre-stored in the server device 5000.

According to another embodiment, the server device 5000 may determine that the user is a valid user when the user identification information and the access target identification information, which are included in the obtained user authentication information, are pre-stored in the server device 5000 and the obtained user identification information is identification information of a user who has access to open the door corresponding to the access target identification information and/or the door operating device 1000 corresponding to the door.

According to another embodiment, the server device 5000 may perform user authentication by further considering the sub-authentication information obtained from the terminal 3000. For example, the server device 5000 may determine that the user is a valid user when the identification information of the sub-reader and the encryption key, which are included in the sub-authentication information, match the identification information of the sub-reader and the encryption key which are pre-stored in the server device 5000.

According to another embodiment, the terminal 3000 may obtain a user authentication result (S310).

The terminal 3000 may obtain the user authentication result from the server device 5000.

According to another embodiment, when the user authentication result indicates that the user is a valid user, the terminal 3000 may obtain access permission information indicating that the user is determined to be a valid user.

According to another embodiment, when the user authentication result indicates that the user is a valid user, the terminal 3000 may obtain door security information corresponding to the user authentication information.

According to another embodiment, the first door-open request information may be obtained (S100).

The sub-reader 2000 may obtain the first door-open request information from the terminal 3000.

The sub-reader 2000 may obtain the first door-open request information from the terminal 3000 using a first communication method.

The sub-reader 2000 may obtain the first door-open request information from the terminal 3000 through the first sub-reader communication unit 2110.

According to another embodiment, the sub-reader 2000 may obtain the secure door information that the terminal 3000 may obtain based on the user authentication result, as the first door-open request information.

According to another embodiment, the sub-reader 2000 may obtain access permission information indicating that the user is determined to be a valid user as the first door-open request information.

According to another embodiment, the sub-reader 2000 may obtain the first door-open request information from at least one of content output from the terminal display unit 3200 and content provided by a device or a medium other than the terminal 3000.

According to another embodiment, the sub-reader sensor unit 2300 may acquire QR code data from an image of a QR code output through the terminal display unit 3200, and the sub-reader control unit 2500 may obtain the QR code data from the sub-reader sensor unit 2300 and obtain the first door-open request information on the basis of the QR code data.

Alternatively, according to another embodiment, the sub-reader sensor unit 2300 may obtain an image of a QR code output through the terminal display unit 3200 and provide the obtained image of the QR code to the sub-reader control unit 2500. The sub-reader control unit 2500 may acquire the QR code data from the obtained image of the QR code and obtain the first door-open request information on the basis of the QR code data.

According to another embodiment, the sub-reader control unit 2500 may acquire the QR code data from an image of the QR code printed on paper and acquire the first door-open request information on the basis of the acquired QR code data.

According to another embodiment, the sub-reader 2000 may acquire the first door-open request information on the basis of biometric information obtained from the user.

The sub-reader sensor unit 2300 may obtain biometric information of the user who requests opening of the door. The sub-reader sensor unit 2300 may provide the obtained biometric information to the sub-reader control unit 2500 and may obtain the biometric information as the first door-open request information.

According to another embodiment, second door-open request information may be obtained (S110).

The sub-reader 2000 may obtain the second door-open request information in a second data format for a second communication method on the basis of the first door-open request information acquired in the first data format for the first communication method.

According to another embodiment, the first door-open request information and the second door-open request information may have different data formats but include the same detailed information.

According to another embodiment, the second door-open request information may be transmitted (S120).

The sub-reader 2000 may transmit the second door-open request information.

The sub-reader 2000 may provide the second door-open request information to the door reader 1100 through the second sub-reader communication unit 2120.

According to another embodiment, a communication method by which the second sub-reader communication unit 2120 transmits the second door-open request information to the door reader 1100 may be the same communication method as that used by the door reader 1100 to obtain the door security information through the door key 4000.

When the door operating device 1000 obtains the second door-open request information from the sub-reader 2000 through the door reader 1100, the door operating device 1000 may determine whether to open or close the door when the door security information is obtained from the door key 4000, and may open or close the door on the basis of the determined result.

Hereinafter, reduction of authentication information and update using the terminal 3000 which are applicable to the above-described one and/or another embodiment will be described with reference to FIGS. 10 to 21.

The reduction of authentication information described herein may be performed by at least one of the door operating device 1000 and the sub-reader 2000 in the access control system according to the above-described one embodiment.

In addition, according to one embodiment, the reduction of authentication information may be performed by one of the door operating device 1000 and the sub-reader 2000 which performs authentication, or may be performed by a combination thereof.

In one example, when the door operating device 1000 and the sub-reader 2000 are provided and the door operating device performs authentication, the sub-reader 2000 may serve to relay data and the reduction of authentication information may be performed by the door operating device 1000.

Alternatively, in one example, when the door operating device 1000 and the sub-reader 2000 are provided and the sub-reader 2000 performs authentication, the reduction of authentication information may be performed by the sub-reader 2000.

In addition, the update using the terminal 300 which will be described below may be performed by at least one of the door operating device 1000 and the sub-reader 2000 in the access control system 10000 according to the above-described one embodiment.

In one example, the update using the terminal 3000 may perform an update for the door operating device 1000.

Alternatively, in one example, the update using the terminal 3000 may perform an update for the sub-reader 2000.

Alternatively, in one example, when the door operating device 1000 and the sub-reader 2000 are provided and an update for the door operating device 1000 is performed, the sub-reader 2000 may serve to relay data.

Hereinafter, in describing the reduction of authentication information and the update using the terminal 3000, the door operating device 1000 will be mainly described for convenience of description, and in describing the reduction of authentication information, the sub-reader 2000 will be omitted and the reduction of authentication information in a situation where authentication is performed in the door operating device 1000 will be illustratively described.

In addition, in describing the update using the terminal 3000, the door operating device 1000 will be described as an object to be updated, but the object to be updated is not limited to the door operating device 1000. In a case where the sub-reader 2000 is an object to be updated, the sub-reader 2000, instead of the door operating device 1000, may be implemented as an object to be updated.

Figure 10:
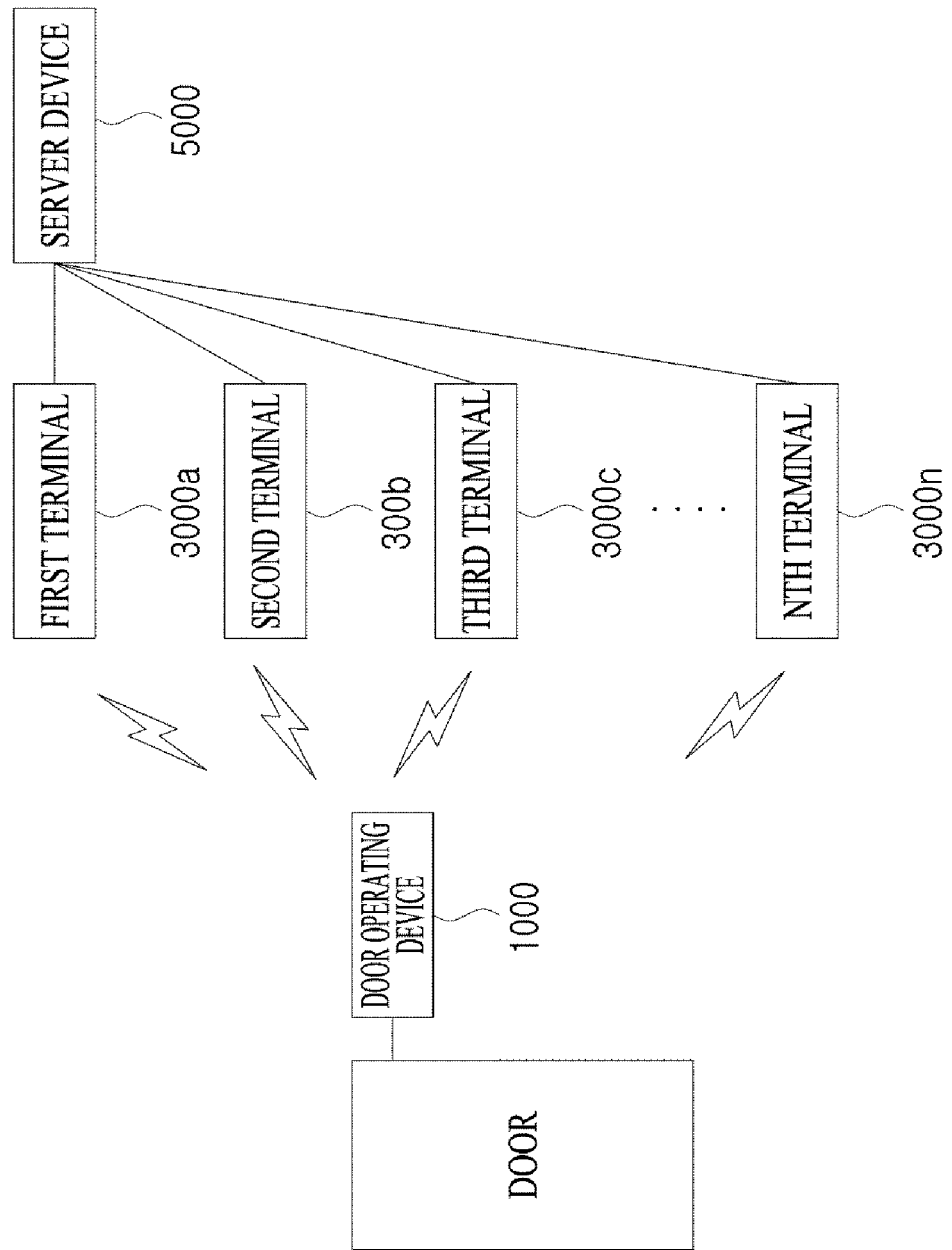
FIG. 10 is an environmental diagram illustrating an access control system according to one embodiment.

FIG. 10 is an environmental diagram illustrating an access control system 10000 according to one embodiment.

Referring to FIG. 10, the access control system 10000 may include a door operating device 1000, at least one terminal 3000, a server device 5000, and a door.

The door operating device 1000 may control opening or closing of the door.

For example, the door operating device 1000 may be installed on the door to control locking or unlocking of the door. The door operating device 1000 may not necessarily be installed on the door and may optionally be provided in various forms. For example, the door operating device 1000 may be installed on a wall adjacent to the door and may provide an obstacle to the door or remove the obstacle therefrom. In addition, when the door is an automatic door, the door operating device 1000 may open or close the door by changing a position of a door leaf.

The door operating device 1000 may be connected to at least one terminal 3000.

For example, as illustrated in FIG. 10, the door operating device 1000 may be connected to a first terminal 3000a, a second terminal 3000b, a third terminal 3000c, and the like.

The terminal 3000 may be an electronic device connected to the door operating device 1000 and the server device 5000.

According to one embodiment, the terminal 3000 may be connected to the door operating device 1000 to transmit identification information.

In addition, according to one embodiment, the terminal 3000 may provide authentication information to the door operating device 1000.

Additionally, according to one embodiment, the terminal 3000 may obtain an authentication token from the server device 5000 and transmit the obtained authentication token to the door operating device 1000 to request opening of the door.

The terminal 3000 may be, for example, an electronic device such as a smartphone, a tablet computer, a PDA, a notebook computer, or a wearable device.

According to one embodiment, the server device 5000 may be connected to the terminal 3000.

According to one embodiment, the server device 5000 may pre-store the authentication token.

The authentication token may include information about an authority assigned to the user and/or the terminal 3000. The authentication token may include identification information about at least one of the door operating device 1000 and the door. In addition, the authentication token may include authority information about whether an authority for opening or passing through at least one of the door operating device 1000 and the door is assigned.

According to one embodiment, the server device 5000 may provide the authentication token to the terminal 3000.

The server device 5000 may receive a request to provide the authentication token from the terminal 3000. In addition, the server device 5000 may transmit the authentication token corresponding to the terminal 3000 and/or the user to the terminal 3000. Additionally, when the server device 5000 receives the request to provide the authentication token, the server device 5000 may perform authentication of the user and/or the terminal 3000 and, when the user and/or the terminal 3000 is authenticated to be valid, transmit the authentication token to the terminal 3000. Furthermore, the server device 5000 may perform authentication of the user and/or the terminal 3000 based on information obtained from the terminal 3000.

The door may block or permit passage through one area. The door may include a doorframe and a door leaf. The door leaf may be a fixed element that defines one area to be permitted to or blocked from being passed. A position blocking or permitting passage may be changed according to a position of the door leaf, and the door leaf may be configured such that a position thereof is changed by an external force. The position change of the door leaf may comprehensively include both a movement of the entire door and the movement by a rotation. In the specification, the door frame and the door leaf are collectively referred to as a door. Therefore, the movement and the position change of the door may refer to the movement and the position change of the door leaf.

2. Second Embodiment: Reduction of Authentication Information

Figure 11:
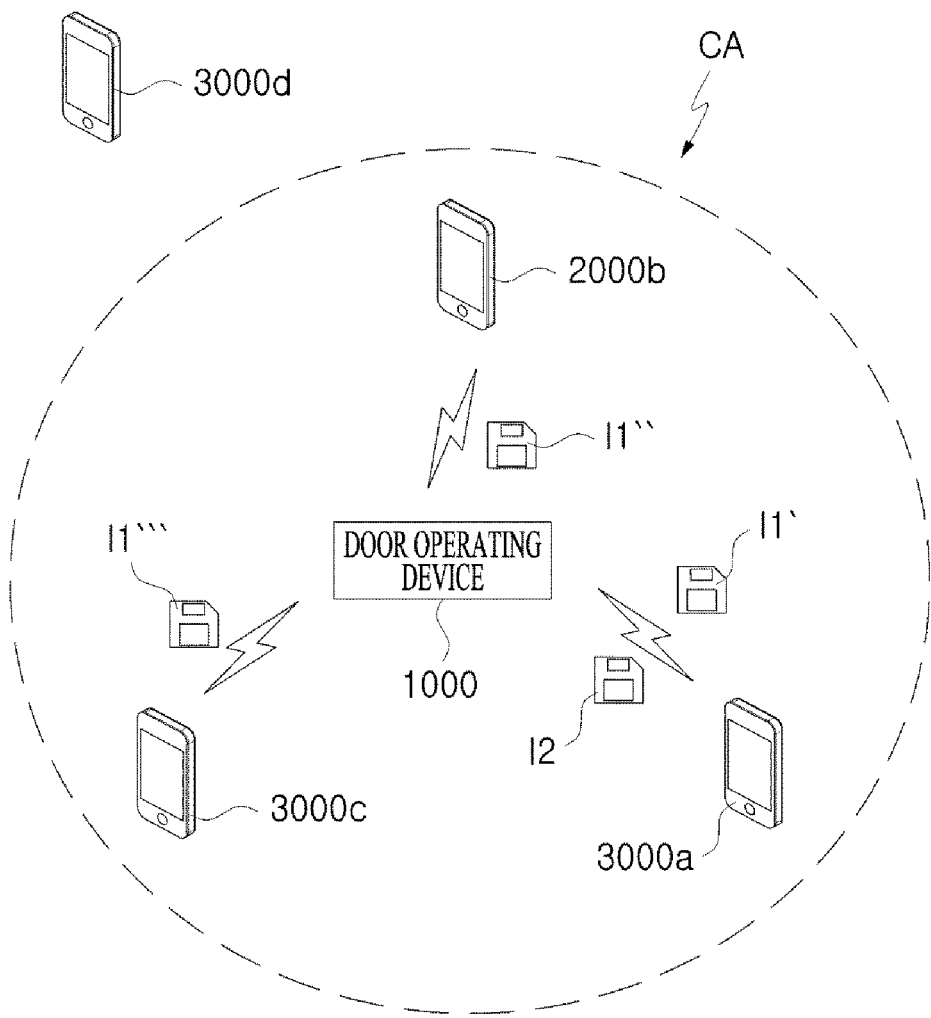
FIG. 11 is a schematic diagram illustrating an authentication method using authentication information according to one embodiment of the present invention.

FIG. 11 is a schematic diagram illustrating an authentication method using authentication information according to one embodiment of the present invention.

In the user authentication method using authentication information according to one embodiment, a door operating device 1000 may obtain identification information I1 from a terminal 3000 located adjacent thereto and obtain only comparison authentication information corresponding to the identification information I1 among pieces of pre-stored comparison authentication information as reference authentication information. In addition, based on target authentication information obtained from a target user and/or a target terminal 3000 and the reference authentication information, the door operating device 1000 may perform authentication of the user and/or the target terminal 3000.

The target user may be a user who requests opening of the door and the target terminal 3000 may be a terminal used by the target user.

For example, in FIG. 11, a first terminal 3000a that provides the identification information I1 and the target authentication information I2 to the door operating device 1000 may be the target terminal 3000.

Accordingly, the door operating device 1000 may perform authentication without using pre-stored all comparison authentication information, thereby improving authentication speed.

In addition, the door operating device 1000 optimizes the number of pieces of authentication information used for authentication by selecting only the authentication information for a user located substantially in the vicinity from the entire comparison authentication information on the basis of the identification information acquired from the terminal 3000 located adjacent thereto, so that an increase in the rate of false acceptance which may occur according to the increase in the number of authentication information entries used for authentication can be minimized.

Figure 12:
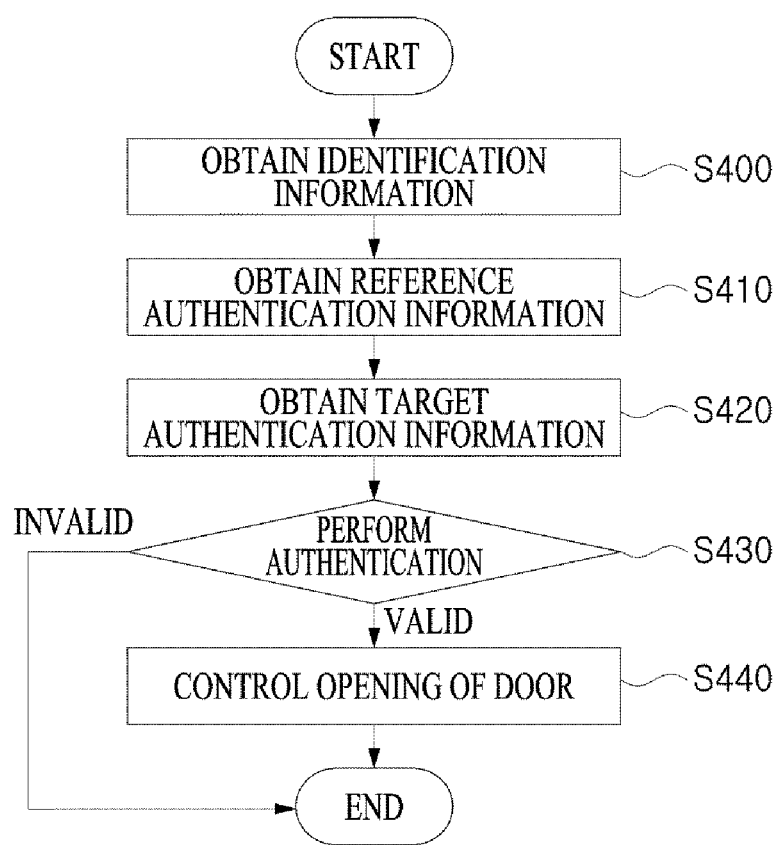
FIG. 12 is a flowchart illustrating an authentication method using authentication information according to one embodiment.

FIG. 12 is a flowchart illustrating an authentication method using authentication information according to one embodiment.

Referring to FIG. 12, the authentication method according to one embodiment may include obtaining identification information (S400), obtaining reference authentication information (S410), obtaining target authentication information (S420), performing authentication (S430), and controlling opening of a door (S440).

According to one embodiment, identification information may be obtained (S400).

The door operating device 1000 may obtain the identification information from at least one terminal 3000.

The identification information according to one embodiment may include at least one of user identification information for identifying a user using the terminal 3000 and terminal identification information distinguishing one terminal 3000 from another terminal 3000.

The door operating device 1000 may obtain the identification information from at least one terminal 3000 located adjacent thereto.

According to one embodiment, the door operating device 1000 may obtain the identification information from the terminal 3000 located within a communication range.

Referring to FIG. 11, the door operating device 1000 may obtain the identification information from a first terminal 3000*a*, a second terminal 3000*b*, and a third terminal 3000*c* which are located within a communication range CA. In addition, the door operating device 1000 may not obtain identification information from a fourth terminal 3000*d* that is located out of the communication range CA. However, when the fourth terminal 3000*d* moves into the communication range CA, the door operating device 1000 may obtain identification information from the fourth terminal 3000*d*.

The door operating device 1000 may obtain the identification information from the terminal 3000 by issuing a request for the identification information to the terminal 3000 with which a communication connection is established.

According to one embodiment, the door operating device 1000 may obtain the identification information from the terminal 3000 located within a predetermined distance.

The door operating device 1000 may determine a distance to the terminal 3000 on the basis of the strength of a signal obtained from the terminal 3000. In addition, the door operating device 1000 may obtain the identification information from the terminal 3000 by issuing a request for the identification information to the terminal 3000 when the distance to the terminal 3000 is within the predetermined distance.

According to one embodiment, when the strength of the signal obtained from the terminal 3000 is greater than or equal to a predetermined strength, the door operating device 1000 may obtain the identification information from the terminal 300 by issuing a request for the identification information to the terminal 3000.

According to one embodiment, the terminal 3000 may determine the signal strength of the signal obtained from the door operating device 1000. Also, the terminal 3000 may be connected to the door operating device 1000 when the signal strength is equal to or greater than a predetermined signal strength. Also, the door operating device 1000 may obtain the identification information from the terminal 3000 by determining that the terminal 1000 is located within a predetermined distance when the door operating device 1000 is communicatively connected with the terminal 3000.

According to one embodiment, reference authentication information may be obtained (S410).

The door operating device 1000 may obtain the reference authentication information among pieces of pre-stored comparison authentication information on the basis of the obtained identification information.

According to one embodiment, a door storage unit 1500 may pre-store at least one piece of comparison authentication information. In addition, the door storage unit 1500 may pre-store identification information corresponding to the comparison authentication information.

The comparison authentication information may be authentication information pre-stored in the door operating device 1000 for user authentication. Therefore, the comparison authentication information may include at least one piece of authentication information.

The door operating device 1000 may obtain the comparison authentication information corresponding to the obtained identification information among pieces of the pre-stored entire comparison authentication information as the reference authentication information.

In addition, when the door operating device 1000 may obtain a plurality of pieces of identification information by obtaining identification information from a plurality of terminals 3000, the door operating device 1000 may obtain identification information corresponding to each of the plurality of pieces of obtained identification information. Alternatively, the door operating device 1000 may obtain the comparison authentication information corresponding to each of the plurality of pieces of identification information as the reference authentication information.

According to one embodiment, target authentication information may be obtained (S420).

The door operating device 1000 may obtain the target authentication information.

The door operating device 1000 may obtain the target authentication information from at least one of the user and the terminal 3000.

According to one embodiment, the door operating device 1000 may obtain the target authentication information from the user.

The door operating device 1000 may obtain the target authentication information from a target object through a door sensor unit 1400.

For example, the door operating device 1000 may obtain information about at least one of a fingerprint, an iris, a vein, a face, and a gesture of the target user through the door sensor unit 1400.

According to one embodiment, the door operating device 1000 may obtain the target authentication information from the terminal 3000.

The door operating device 1000 may obtain the target authentication information from the terminal 3000 through a door reader 1100.

For example, the door operating device 1000 may obtain the target authentication information including information about at least one of the fingerprint, the iris, the vein, and the face of the user.

According to one embodiment, the door operating device 1000 may further obtain an authentication token.

According to one embodiment, authentication may be performed (S430).

The door operating device 1000 may perform authentication of at least one of the user and the terminal 3000 based on the reference authentication information and the target authentication information.

According to one embodiment, when authentication information matching the target authentication information is present in the reference authentication information, the door operating device 1000 may determine that the user corresponding to the target authentication information is a valid user.

To describe an example in which the authentication information is fingerprint information, when fingerprint information matching fingerprint information obtained as the target authentication information is included in the reference authentication information, the door operating device 1000 may determine that the user corresponding to the target authentication information is a valid user.

According to one embodiment, when authentication information whose similarity to the target authentication information is greater than a predetermined similarity is included in the reference authentication information, the door operating device 1000 may determine that the user corresponding to the target authentication information is a valid user.

According to one embodiment, opening of the door may be controlled (S440).

The door operating device 1000 may control the door to be opened when the authentication result is valid.

When the authentication result is valid, the door operating device 1000 may supply power through a door power unit 1600 so that the door is in an unlocked state.

In addition, according to one embodiment, when the door operating device 1000 obtains an authentication token from the terminal 3000, the door operating device 1000 may determine whether to control the door to be opened by further taking into account authority information included in the authentication token. When it is determined that the authentication token holds authority for opening the door, the door operating device 1000 may supply power through the door power unit 1600 so that the door is in an unlocked state.

In addition, when the authentication token does not hold authority for opening the door although the authentication result is valid, the door operating device 1000 may determine that authority is invalid for opening the door and may hence not open the door.

Figure 13:
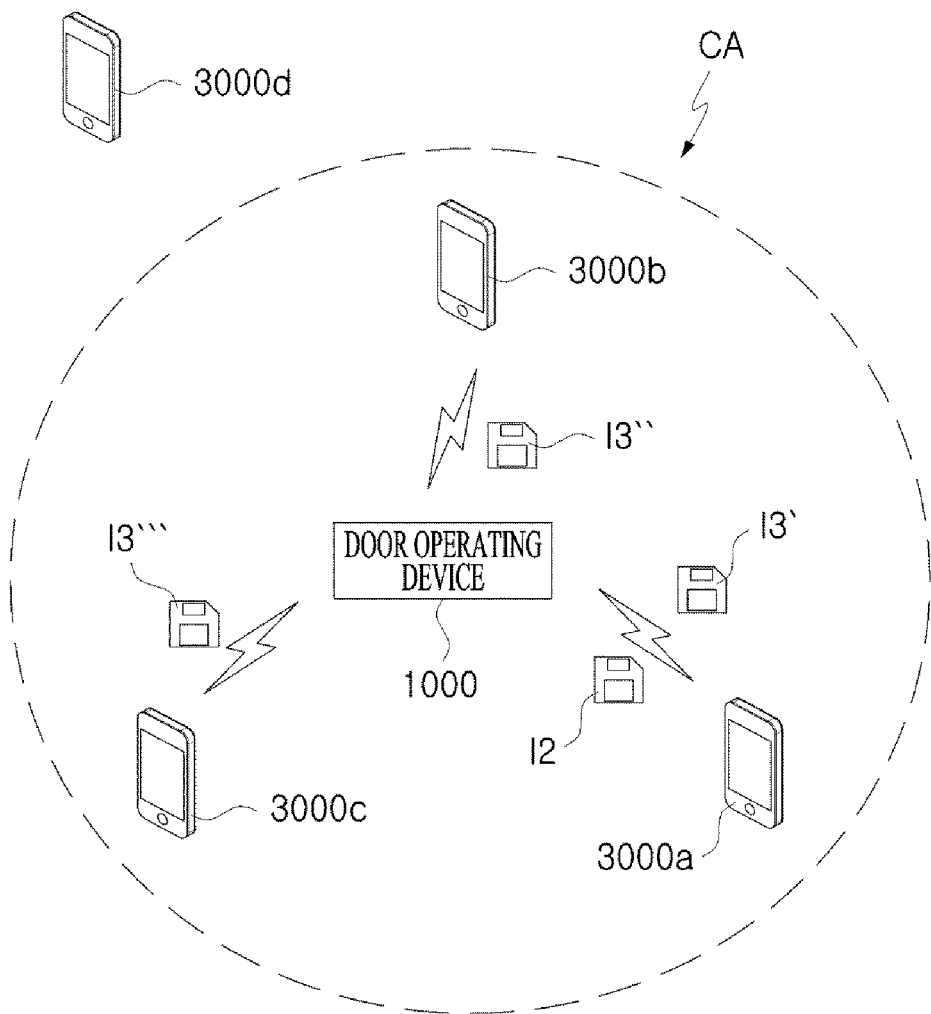
FIG. 13 is a schematic diagram illustrating another authentication method according to one embodiment.

FIG. 13 is a schematic diagram illustrating another authentication method according to one embodiment.

According to another authentication method according to one embodiment, a door operating device 1000 may obtain reference authentication information I3 used for authentication from a terminal 3000 located adjacent thereto. In addition, a door operating device 3000 may perform authentication based on the reference authentication information obtained from the user terminal 3000 located adjacent thereto and target authentication information obtained from at least one target terminal 3000 among the terminals 3000 located adjacent thereto and/or a target user. Accordingly, the door operating device 1000 may perform authentication without storing comparison authentication information in advance.

Figure 14:
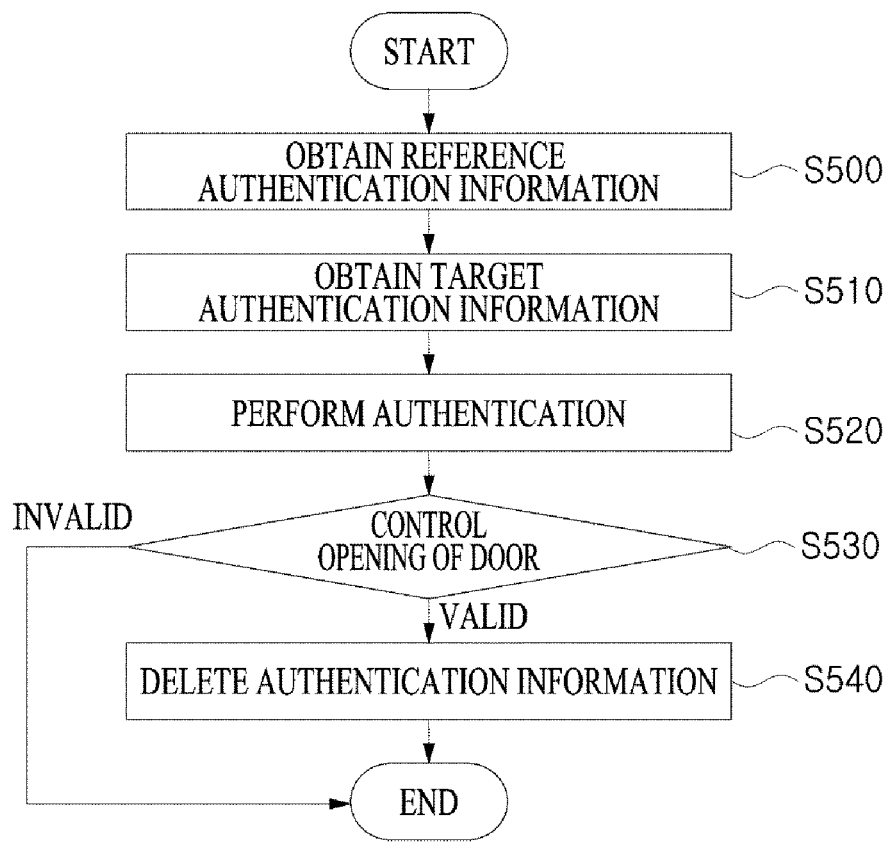
FIG. 14 is a flowchart illustrating another authentication method according to one embodiment of the present invention.

FIG. 14 is a flowchart illustrating another authentication method according to one embodiment of the present invention.

Another authentication method according to one embodiment may include obtaining reference authentication information (S500), obtaining target authentication information (S510), performing authentication (S520), controlling opening of a door (S530), and deleting authentication information (S540).

According to one embodiment, reference authentication information may be obtained (S500).

The door operating device 1000 may obtain reference authentication information from at least one terminal 3000.

The door operating device 1000 may obtain authentication information from the terminal 3000 by requesting the terminal 3000 to transmit stored authentication information and obtain the authentication information obtained from the terminal 3000 as the reference authentication information.

The door operating device 1000 may obtain the reference authentication information from at least one terminal 3000 located adjacent thereto.

According to one embodiment, the door operating device 1000 may obtain the identification information from the terminal 3000 located within a communication range.

The door operating device 1000 may obtain the reference authentication information from the terminal 3000 by issuing a request for the reference authentication information to the terminal 3000 with which a communication connection is established.

According to one embodiment, the door operating device 1000 may obtain the reference authentication information from the terminal 3000 located within a predetermined distance.

The door operating device 1000 may determine a distance to the terminal 3000 on the basis of the strength of a signal obtained from the terminal 3000. In addition, the door operating device 1000 may obtain the reference authentication information from the terminal 3000 when the distance to the terminal 3000 is within the predetermined distance.

According to one embodiment, when the strength of the signal obtained from the terminal 3000 is greater than or equal to a predetermined strength, the door operating device 1000 may obtain the reference authentication information from the terminal 300.

According to one embodiment, the terminal 3000 may determine the signal strength of the signal obtained from the door operating device 1000. Also, the terminal 3000 may be connected to the door operating device 1000 when the signal strength is equal to or greater than a predetermined signal strength. Also, the door operating device 1000 may obtain the reference authentication information from the terminal 3000 by determining that the terminal 1000 is located within a predetermined distance when the door operating device 1000 is communicatively connected with the terminal 3000.

According to one embodiment, target authentication information may be obtained (S510).

According to one embodiment, the door operating device 1000 may obtain the target authentication information from a target user.

The door operating device 1000 may obtain the target authentication information from the target user through a door sensor unit 1400.

According to one embodiment, the door operating device 1000 may obtain the target authentication information from the terminal 3000.

The door operating device 1000 may obtain the target authentication information through the door reader 1100.

According to one embodiment, the door operating device 1000 may obtain an authentication token.

According to one embodiment, authentication may be performed (S520).

The door operating device 1000 may perform authentication based on the reference authentication information and the target authentication information.

According to one embodiment, when authentication information whose similarity to the target authentication information is greater than a predetermined similarity is included in the reference authentication information, the door operating device 1000 may determine that the user corresponding to the target authentication information is a valid user.

According to one embodiment, opening of the door may be controlled (S530).

The door operating device 1000 may control the door to be opened when the authentication result is valid.

When the authentication result is valid, the door operating device 1000 may supply power through the door power unit 1600 so that the door is in an unlocked state.

In addition, according to one embodiment, when the door operating device 1000 obtains the authentication token from the terminal 3000, the door operating device 1000 may determine whether to control the door to be opened by further taking into account authority information included in the authentication token. When it is determined that the authentication token holds authority for opening the door, the door operating device 1000 may supply power through the door power unit 1600 so that the door is in an unlocked state.

Additionally, when the authentication token does not hold authority for opening the door although the authentication result is valid, the door operating device 1000 may determine that authority is invalid for opening the door and may hence not open the door.

According to one embodiment, the authentication information may be deleted (S540).

The door operating device 1000 may delete the obtained authentication information.

Here, the obtained authentication information may include at least one of the reference authentication information and the target authentication information.

According to one embodiment, the door operating device 1000 may delete the obtained authentication information when a predetermined period of time has elapsed from the time of acquiring the authentication information.

According to one embodiment, when the authentication is completed, the door operating device 1000 may delete the authentication information which has been used in authentication.

According to one embodiment, the door operating device 1000 may delete the authentication information used in authentication when a predetermined period of time has elapsed from the time of completion of the authentication.

According to one embodiment, the door operating device 1000 may delete the obtained authentication information when a predetermined time point arrives.

For example, the door operating device 1000 may delete the acquired and stored authentication information when the current time becomes 9:00 p.m.

Figure 15:
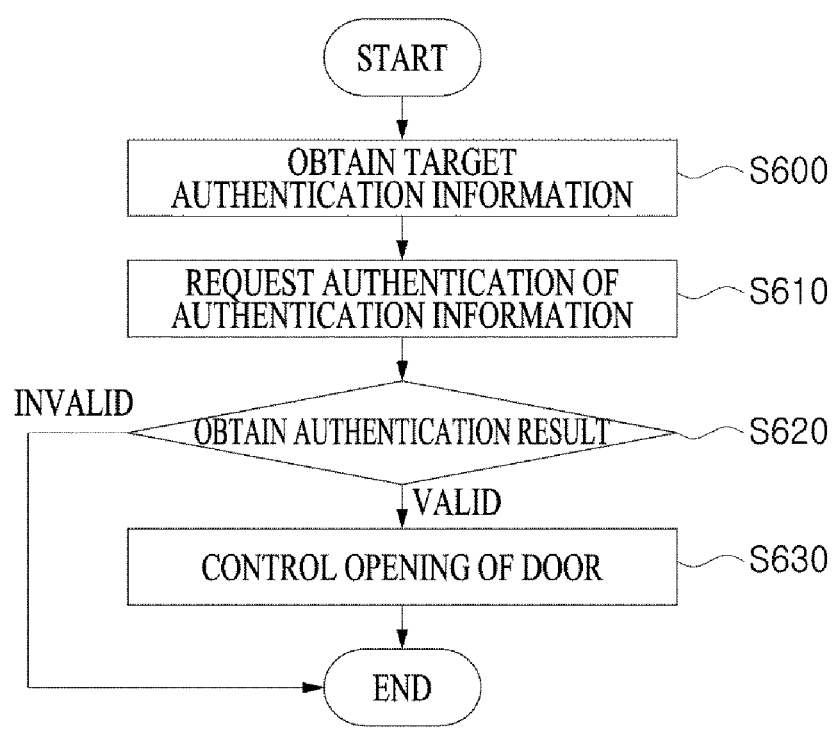
FIG. 15 is a flowchart illustrating still another user authentication method according to one embodiment.

FIG. 15 is a flowchart illustrating still another user authentication method according to one embodiment.

Referring to FIG. 15, still another authentication method according to one embodiment may include obtaining target authentication information (S600), requesting authentication (S610), obtaining an authentication result (S620), and controlling opening of a door (S630).

According to one embodiment, target authentication information may be obtained (S600).

According to one embodiment, the door operating device 1000 may obtain the target authentication information from a target user.

The door operating device 1000 may obtain the target authentication information from the target user through a sensor unit 1400.

According to one embodiment, the door operating device 1000 may further obtain an authentication token.

According to one embodiment, authentication may be requested (S610).

The door operating device 1000 may request a nearby terminal 3000 for authentication.

The door operating device 1000 may request authentication by transmitting the target authentication information to the nearby terminal 3000.

According to one embodiment, the door operating device 1000 may transmit encoded target authentication information obtained by encoding the target authentication information with a predetermined encryption key to the nearby terminal 3000.

In addition, the terminal 3000 may obtain encoded target authentication information. The terminal 3000 may obtain the target authentication information by decoding the obtained encoded target authentication information with a predetermined encryption key.

According to one embodiment, an authentication result may be obtained (S620).

According to one embodiment, the terminal 3000 may transmit the authentication result to the door operating device 1000.

The door operating device 1000 may obtain the authentication result.

According to one embodiment, the door operating device 1000 may obtain the authentication result from the terminal 3000 requested for authentication.

When the authentication result obtained from the terminal 3000 requested for authentication holds validity, the door operating device 1000 may determine that a user is a valid user.

According to one embodiment, opening of the door may be controlled (S630).

The door operating device 1000 may control the door to be opened when the authentication result is valid.

When the authentication result is valid, the door operating device 1000 may supply power through the door power unit 1600 so that the door is in an unlocked state.

In addition, according to one embodiment, when the door operating device 1000 obtains the authentication token from the terminal 3000, the door operating device 1000 may determine whether to control the door to be opened by further taking into account authority information included in the authentication token. When it is determined that the authentication token holds authority for opening the door, the door operating device 1000 may supply power through the door power unit 1600 so that the door is in an unlocked state.

Additionally, when the authentication token does not hold authority for opening the door although the authentication result is valid, the door operating device 1000 may determine that authority is invalid for opening the door and may hence not open the door.

The authentication method according to various embodiments of the present invention has been described above. The authentication method according to various embodiments of the present invention is not limited to the above description and may be provided in various forms according to the implementation environment. For example, in the authentication method according to various embodiments of the present invention described above, the door operating device 1000 is described as an entity that performs authentication, but the embodiments of the present invention are not limited thereto. When the server device 5000 connected to the door operating device 1000 is provided, the server device 5000 may perform authentication in place of the door operating device 1000.

3. Third Embodiment: Update Using Terminal

Figure 16:
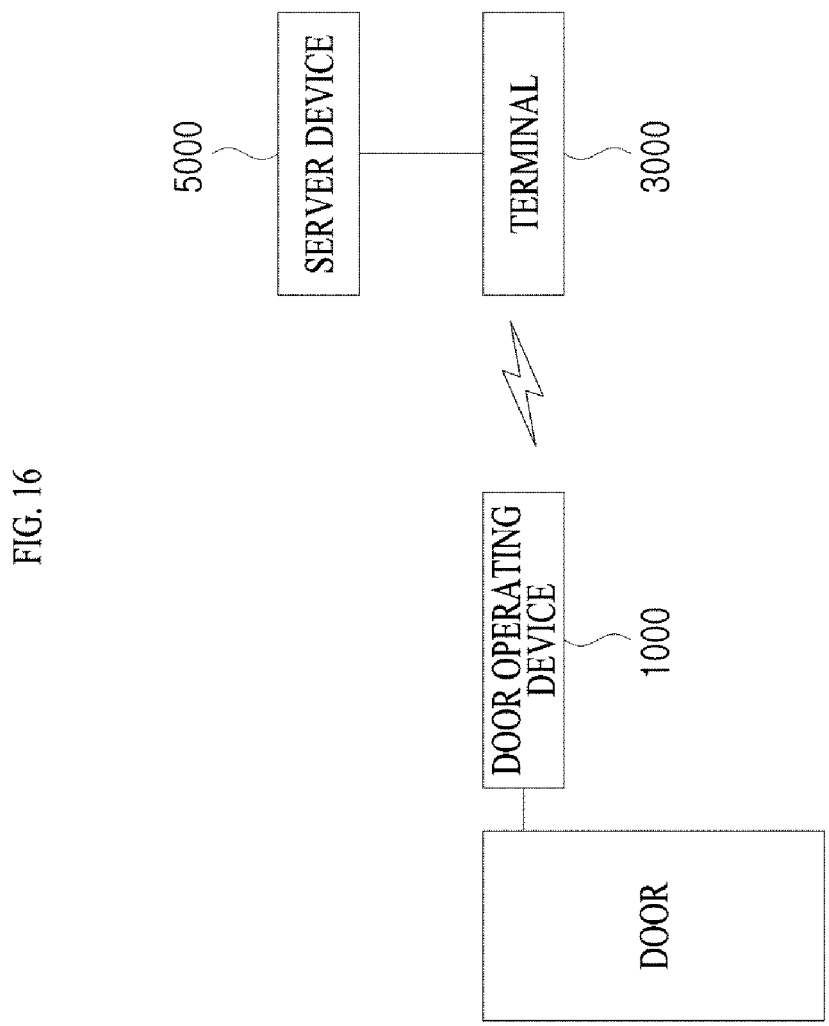
FIG. 16 is a diagram illustrating an update method using a terminal according to one embodiment.

FIG. 16 is a diagram illustrating an update method using a terminal 3000 according to one embodiment.

According to one embodiment, the terminal 3000 may obtain update information from a server device 5000. The update information may be information for updating information, such as software for operation of a door operating device 1000, authority information stored in the door operating device 1000, and authentication information. For example, the update information may be information, such as authority information, authentication information, and the like, to be additionally stored in the door operating device 1000.

According to one embodiment, the door operating device 1000 may perform updates based on the information obtained from the terminal 3000. In this case, the update may be an update of software for operation of the door operating device 1000 or an update of authentication information, authentication information, and the like which are stored in the door operating device 1000.

Figure 17:
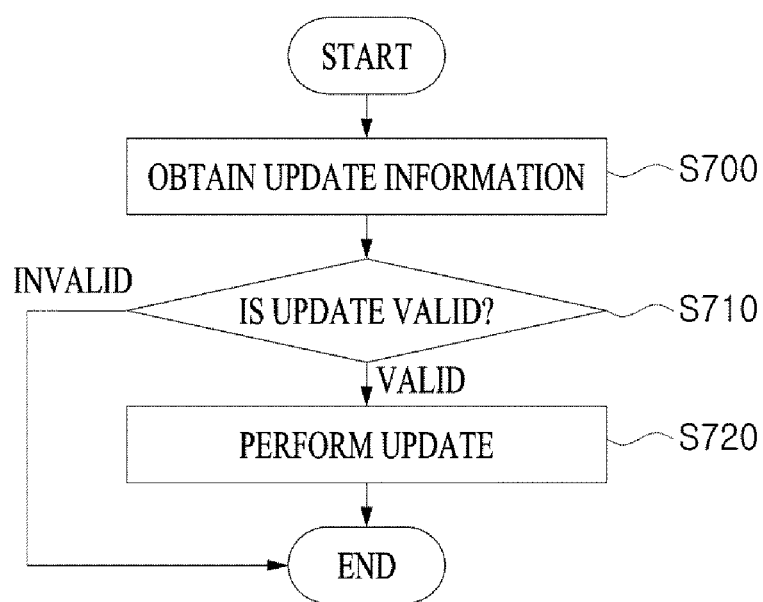
FIG. 17 is a flowchart illustrating the update method using a terminal according to one embodiment.

FIG. 17 is a flowchart illustrating the update method using a terminal 3000 according to one embodiment.

Referring to FIG. 17, the update method using the terminal 3000 according to one embodiment may include obtaining update information (S700), determining whether the update is valid (S710), and performing an update (S720).

According to one embodiment, the update information may be obtained (S700).

The door operating device 1000 may obtain the update information from the terminal 3000.

The door operating device 1000 may receive an update request including the update information from the terminal 3000.

In addition, the terminal 3000 may obtain the update information from the server device 5000.

According to one embodiment, the terminal 3000 may obtain the update information by issuing a request for the update information to the server device 5000.

According to one embodiment, the terminal 3000 may obtain the update information in response to a request from the server device 5000.

According to one embodiment, when target authentication information obtained from the terminal 3000 includes the update information, the door operating device 1000 may obtain the update information included in the target authentication information.

When the target authentication information includes an identifier indicating that the update information is included in the target authentication information, the door operating device 1000 may obtain the update information included in the target authentication information.

According to one embodiment, the door operating device 1000 may obtain an authentication token from the terminal 3000 and obtain the update information from the terminal 3000 on the basis of authority information included in the authentication token when the authentication token holds authority for the update.

According to one embodiment, it may be determined whether the update is valid (S710).

The door operating device 1000 may determine whether update information I4 is valid.

According to one embodiment, the door operating device 1000 may compare a version of software included in the update information obtained from the terminal 3000 with a version of software previously installed in the door operating device 1000. In addition, when the version of the software included in the update information obtained from the terminal 3000 is a later version of the software previously installed in the door operating device 1000, the door operating device 1000 may determine that the update information I4 is valid.

According to one embodiment, the door operating device 1000 may compare authority information included in the update information obtained from the terminal 3000 with authority information pre-stored in the door operating device 1000. When modified or added items are found from the comparison between the authority information included in the update information obtained from the terminal 3000 and the authority information pre-stored in the door operating device 1000, the door operating device 1000 may determine that the update information I4 is valid.

For example, when the comparison between the authority information included in the update information obtained from the terminal 3000 and the authority information pre-stored in the door operating device 1000 shows that authority for at least one user needs to be changed, the door operating device 1000 may determine that the update information I4 is valid.

In another example, when the comparison between the authority information included in the update information obtained from the terminal 3000 and the authority information pre-stored in the door operating device 1000 shows that authority information for a user that does not appear in the authority information pre-stored in the door operating device 1000 is included in the authority information contained in the update information obtained from the terminal 3000, the door operating device 1000 may determine that the update information I4 is valid.

According to one embodiment, the door operating device 1000 may compare authentication information included in the update information obtained from the terminal 3000 with authentication information pre-stored in the door operating device 1000. When modified or added items are found from the comparison between the authentication information included in the update information obtained from the terminal 3000 and the authentication information pre-stored in the door operating device 1000, the door operating device 1000 may determine that the update information I4 is valid.

For example, when the comparison between the authentication information included in the update information obtained from the terminal 3000 and the authentication information pre-stored in the door operating device 1000 shows that authentication information for a user that does not appear in the authentication information pre-stored in the door operating device 1000 is included in the authentication information contained in the update information obtained from the terminal 3000, the door operating device 1000 may determine that the update information I4 is valid.

According to one embodiment, an update may be performed (S720).

The door operating device 1000 may perform the update on the basis of the update information I4.

According to one embodiment, the door operating device 1000 may perform the update when the update information I4 is determined to be valid.

The door operating device 1000 may perform the update by storing data included in the update information I4 in a door storage unit 1500.

The door operating device 1000 according to one embodiment may perform the update by storing the authority information included in the update information I4 in the door storage unit 1500.

In addition, the door operating device 1000 may store the authority information included in the update information I4, except for information that is redundant to the authority information pre-stored in the door storage unit 1500.

Additionally, the door operating device 1000 may compare the authority information included in the update information I4 with the authority information pre-stored in the door storage unit 1500 and may update modified authority information in the pre-stored authority information to the authority information included in the update information I4.

The door operating device 1000 according to one embodiment may perform the update by storing the authentication information included in the update information I4 in the door storage unit 1500.

In addition, the door operating device 1000 may store the authentication information included in the update information I4, except for information that is redundant to the authentication information pre-stored in the door storage unit 1500.

Figure 18:
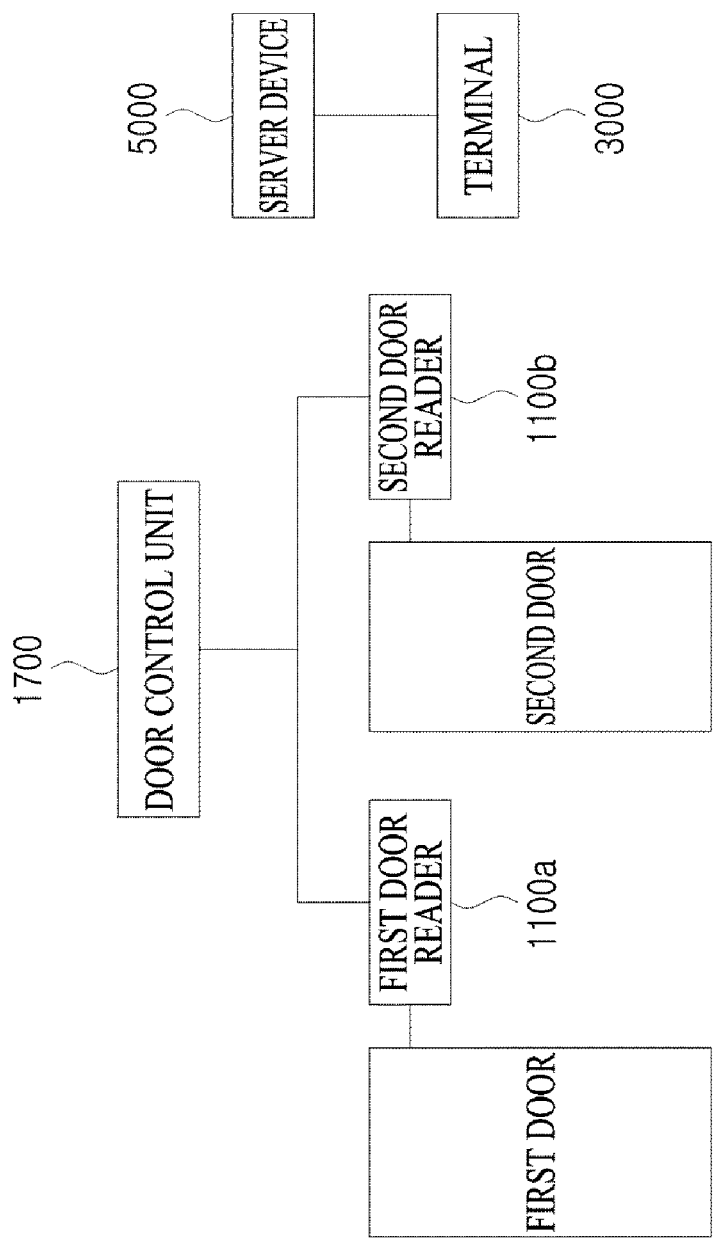
FIG. 18 is an environmental diagram illustrating an update using a terminal according to another embodiment.

FIG. 18 is an environmental diagram illustrating an update using a terminal 3000 according to another embodiment.

Referring to FIG. 18, the environment of the update using a terminal 3000 may be formed by connecting a plurality of door readers 1100 to one door control unit 1700. The door reader 1100 may transmit update information obtained from the terminal 3000 to the door control unit 1700. The door control unit 1700 may obtain the update information from one of the plurality of door readers 1100. The door control unit 1700 may transmit the obtained update information to another connected door reader 1100.

In the environment of the update using the terminal 3000 according to another embodiment, the door reader 1100 may perform authentication based on at least one of authentication information and authority information. The door reader 1100 may include a separate controller (not shown) and a storage unit (not shown) to perform authentication.

In addition, a program for operation may be pre-stored in the storage unit of the door reader 1100.

Figure 19:
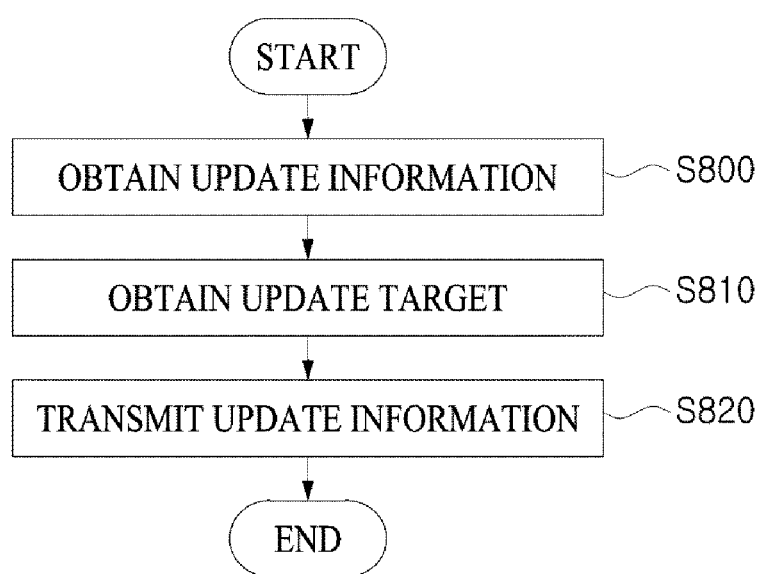
FIG. 19 is a diagram illustrating an update method using a user terminal according to another embodiment.

FIG. 19 is a diagram illustrating an update method using a user terminal according to another embodiment.

Referring to FIG. 19, the update method using a user terminal according to another embodiment may include obtaining update information (S800), obtaining an update target (S810), and transmitting the update information (S820).

According to another embodiment, the update information may be obtained (S800).

The door reader 1100 may obtain the update information from the terminal 3000.

The door reader 1100 may receive an update request including the update information from the terminal 3000.

According to another embodiment, when target authentication information obtained from the terminal 2000 includes the update information, the door reader 1100 may obtain the update information included in the target authentication information.

When the target authentication information includes an identifier indicating that the update information is included in the target authentication information, the door reader 1100 may obtain the update information included in the target authentication information.

According to another embodiment, the door reader 1100 may obtain an authentication token from the terminal 3000 and obtain the update information from the terminal 3000 when the authentication token holds authority for an update.

The door reader 1100 may transmit the obtained update information to a door control unit 1700.

According to another embodiment, an update target may be obtained (S810).

The door control unit 1700 may obtain the update information.

The door control unit 1700 may obtain the door reader 1100 to request the update by transmitting the obtained update information.

According to another embodiment, the door operating device 1000 may compare a version of software included in the obtained update information with a version of software previously installed in the plurality of door readers 1100.

In addition, when the version of the software included in the update information obtained from the terminal 3000 is a later version of the software previously installed in the door reader 1100, the door control unit 1700 may obtain the corresponding door reader 1100 as an update target.

According to another embodiment, the door control unit 1700 may compare authority information included in the obtained update information with authority information pre-stored in the plurality of door readers 1100. When modified or added items are found from the comparison between the authority information included in the update information and the authority information pre-stored in the door reader 1100, the door control unit 1700 may obtain the corresponding door reader 1100 as the update target.

For example, when the comparison between the authority information included in the obtained update information and the authority information pre-stored in the door reader 1100 shows that authority for at least one user needs to be changed, the door control unit 1700 may obtain the corresponding door reader 1100 as the update target.

In another example, when the comparison between the authority information included in the obtained update information and the authority information pre-stored in the door reader 1100 shows that authority information for a user that does not appear in the authority information pre-stored in the door reader 1100 is included in the authority information contained in the obtained update information, the door control unit 1700 may obtain the corresponding door reader 1100 as the update target.

According to another embodiment, the door control unit 1700 may compare authentication information included in the obtained update information with authentication information pre-stored in the plurality of door readers 1100. When modified or added items are found from the comparison between the authentication information included in the update information and the authentication information pre-stored in the door reader 1100, the door control unit 1700 may obtain the corresponding door reader 1100 as the update target.

For example, when the comparison between the authority information included in the obtained update information and the authority information pre-stored in the door reader 1100 shows that authority information for a user that does not appear in the authority information pre-stored in the door reader 1100 is included in the authority information contained in the obtained update information, the door control unit 1700 may obtain the corresponding door reader 1100 as the update target.

According to another embodiment, the update information may be transmitted (S820).

The door control unit 1700 may control the update data to be transmitted to the door reader 1100 included in the update target.

In addition, the door control unit 1700 may update at least one of software, authority information, and authentication information to the update information received through the door reader 1100.

Figure 20:
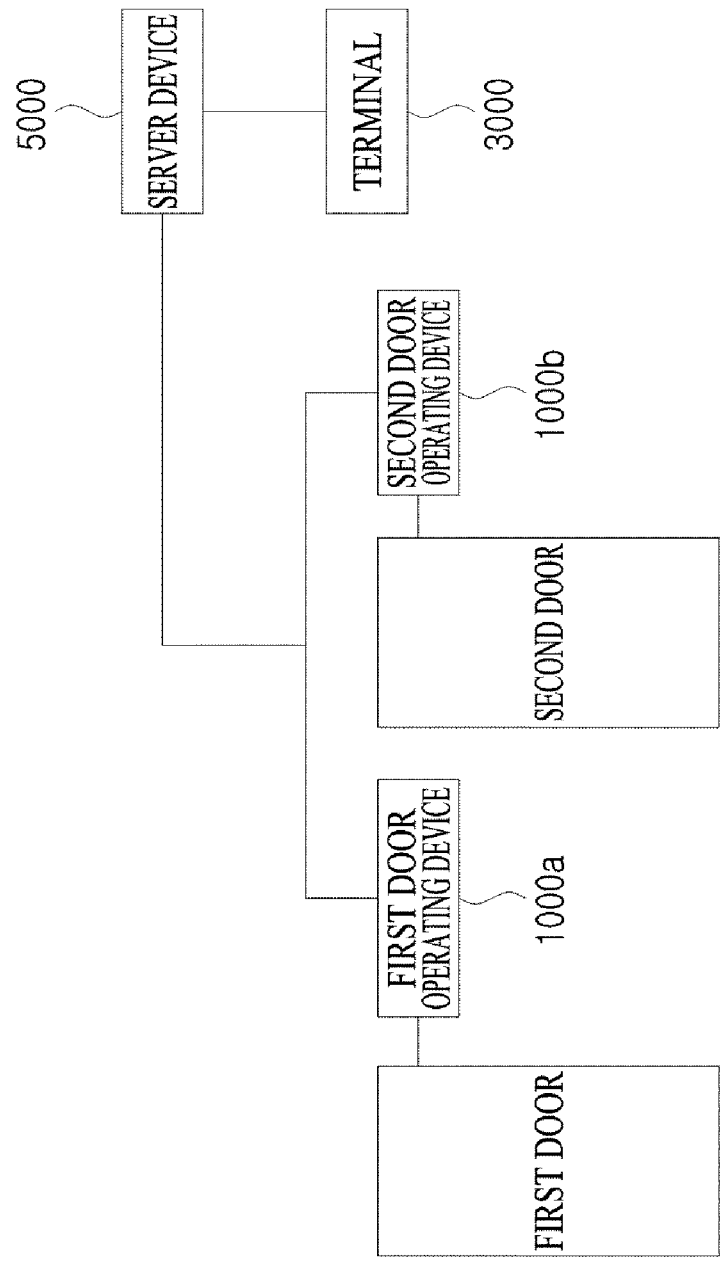
FIG. 20 is an environmental diagram illustrating an authentication method according to still another embodiment of the present invention.

FIG. 20 is an environmental diagram illustrating an authentication method according to still another embodiment of the present invention.

Referring to FIG. 20, a server device 5000 may be connected to a plurality of door operating devices 1000. For example, the server device 5000 may be connected to a first door operating device 1000*a* and a second door operating device 1000*b* as shown in FIG. 20.

The server device 5000 may pre-store comparison authentication information. In addition, the server device 5000 may obtain reference authentication information on the basis of identification information obtained from the door operating device 1000.

The server device 5000 may be connected to a terminal 3000 and obtain target authentication information from the user terminal 3000.

In addition, the server device 5000 may perform authentication based on the reference authentication information and the target authentication information.

Figure 21:
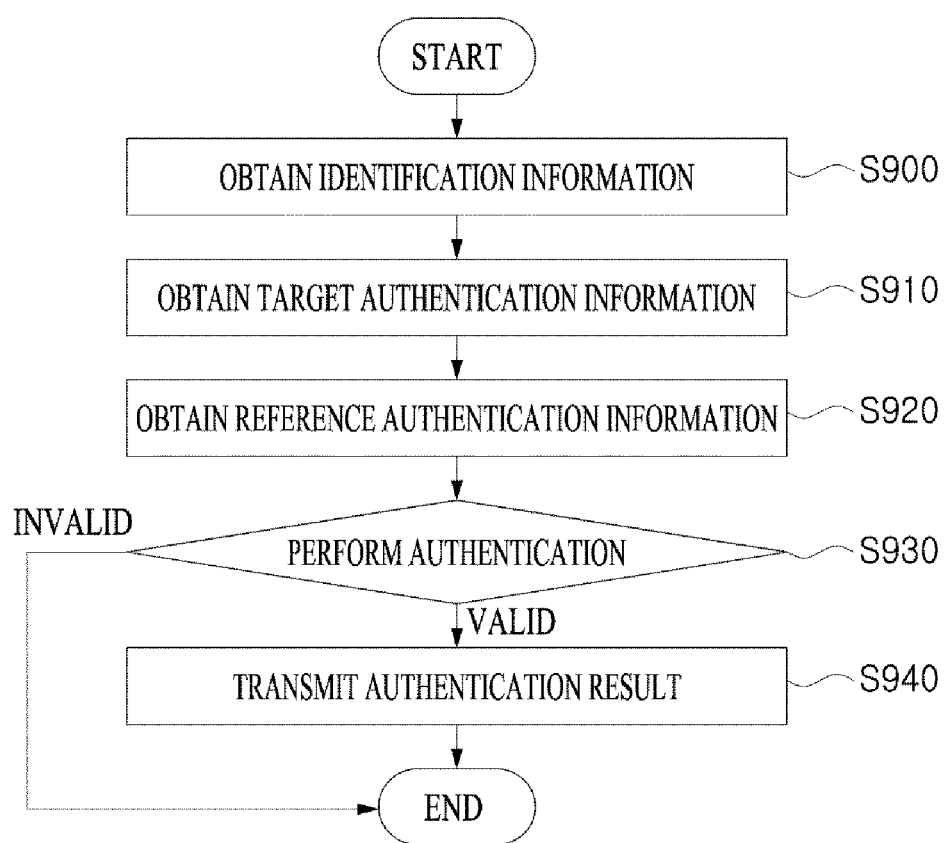
FIG. 21 is a diagram illustrating an authentication method according to yet another embodiment of the present invention.

FIG. 21 is a diagram illustrating an authentication method according to yet another embodiment of the present invention.

Referring to FIG. 21, the authentication method according to yet another embodiment of the present invention may include obtaining identification information (S900), obtaining target authentication information (S910), obtaining reference authentication information (S920), performing authentication (S930), and transmitting an authentication result (S940).

According to yet another embodiment, the identification information may be obtained (S610).

A server device 5000 may obtain the identification information from a door operating device 1000.

According to yet another embodiment, the door operating device 1000 may obtain identification information from at least one terminal 3000.

The server device 5000 may obtain the identification information that the connected door operating device 1000 obtains from at least one terminal 3000 located adjacent thereto.

According to yet another embodiment, the server device 5000 may obtain the identification information obtained by the door operating device 1000 and identification information about the door operating device 1000 from the door operating device 1000.

According to yet another embodiment, target authentication information may be obtained (S910).

According to yet another embodiment, the server device 5000 may obtain the target authentication information from the terminal 3000.

The server device 5000 may obtain the target authentication information from the terminal 3000 through a server communication unit 5100.

The server device 5000 may obtain the identification information about at least one of a door operating device 1000 and a door which are desired to be opened from the terminal 3000.

According to yet another embodiment, the server device 5000 may obtain an authentication token from the terminal 3000.

According to yet another embodiment, reference authentication information may be obtained (S920).

The server device 5000 may obtain the reference authentication information on the basis of the identification information obtained from the door operating device 1000.

According to yet another embodiment, the server device 5000 may obtain the reference authentication information on the basis of the identification information obtained from the plurality of connected door operating device 1000.

For example, the server device 5000 may obtain identification information A, B, and C from a first door operating device 1000*a* and identification information D and E from a second door operating device 1000*b*. The server device 5000 may obtain comparison authentication information corresponding to each of the obtained identification information A, B, C, D, and E as reference authentication information.

According to yet another embodiment, the server device 5000 may obtain the reference authentication information on the basis of identification information, among pieces of identification information obtained from the plurality of connected door operating device 1000, that corresponds to the identification information about at least one of the door operating device and the door desired to be open which is obtained from the terminal 3000.

For example, the server device 5000 may obtain the identification information A, B, and C from the first door operating device 1000*a* and the identification information D and E from the second door operating device 1000*b*. In addition, the server device 5000 may obtain the identification information about the first door operating device 1000*a* desired to be opened from the terminal 3000. The server device 5000 may obtain the identification information A, B, and C obtained from the first door operating device 1000*a* as the reference authentication information.

According to yet another embodiment, authentication may be performed (S930).

The server device 5000 may perform authentication based on the reference authentication information and target authentication information.

According to yet another embodiment, when authentication information whose similarity to the target authentication information is greater than a predetermined similarity is included in the reference authentication information, the server device 5000 may determine that the user corresponding to the target authentication information is a valid user.

According to yet another embodiment, an authentication result may be transmitted (S940).

The server device 5000 may transmit the authentication result to the terminal 3000 that transmits the target authentication information.

The terminal 3000 which has received the authentication result may request opening of the door by transmitting the authentication result to the door operating device 1000.

According to yet another embodiment, the server device 5000 may transmit the authentication result to the door operating device 1000. The server device 5000 may transmit the authentication result to the door operating device 1000 that corresponds to the door operating device identification information transmitted from the terminal 3000.

In addition, when the authentication result is valid, the door operating device 1000 may request the door operating device 1000, corresponding to the door operating device identification information transmitted by the terminal 3000, to open the door.

Information necessary for opening a door can be acquired by a communication method that is not supported by an existing installed door operating device without replacing the existing installed door operating device.

An authentication method that is not supported by the existing installed door operating device can be provided without replacing the existing installed door operating device.

Effects of the present invention may not be limited to the above, and other effects of the present invention will be clearly understandable to those having ordinary skill in the art from the above-described disclosure together with accompanying drawings.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A sub-reader device communicating with a reader device such that the reader device communicating using first communication protocol communicates with first device communicating using second communication protocol different from the first communication protocol via the sub-reader device, wherein the second communication protocol is not supported by the reader device, the sub-reader device comprising:
  a processor configured to obtain first request information using the second communication protocol from the first device, obtain second request information based on the first request information, and provide the second request information to the reader device using the first communication protocol,
  wherein the sub-reader device authenticates the first request information based on first information,
  wherein the first information is obtained from a server or pre-stored in the sub-reader device,
  wherein the second request information is provided to the reader device when the first request information is authenticated, and
  wherein the sub-reader device obtains the first request information when the first device receives information related to the first request information from the server.

2. The sub-reader device of claim 1, wherein:
  a data format of the first request information is first data format corresponding to the second communication protocol, and
  the sub-reader device obtains the second request information by converting the data format of the first request information into second data format corresponding to the first communication protocol.

3. The sub-reader device of claim 2, wherein the first request information and the second request information include detailed information.

4. The sub-reader device of claim 3, wherein the detailed information includes at least one of user identification information, the first device identification information, authentication information, and security information.

5. The sub-reader device of claim 1, wherein the sub-reader device obtains the second request information when the first request information is authenticated.

6. The sub-reader device of claim 5, wherein the second request information includes the result of the authentication.

7. The sub-reader device of claim 1, wherein third request information is provided from second device to the reader device without an authentication of the third request information, when the reader device directly communicates to the second device using the first communication protocol.

8. The sub-reader device of claim 7, wherein when the second device communicates using the first communication protocol and the second device is located in a communication range of the sub-reader device and a communication range of the reader device, the sub-reader device is controlled not to communicate with the second device such that the reader device directly communicates with the second device without communication between the sub-reader device and the reader device.

9. The sub-reader device of claim 1, wherein the sub-reader device transmits the first request information to the server to request authentication of the first request information.

10. The sub-reader device of claim 9, wherein the sub-reader device obtains the second request information when the first request information is authenticated by the server.

11. The sub-reader device of claim 1, wherein the sub-reader device obtains the first request information when the first device requests the server to perform authenticating the first request information and the first request information is authenticated by the server.

12. The sub-reader device of claim 1, wherein the sub-reader obtains the second request information including pre-stored security information when the first request information is authenticated.

13. The sub-reader device of claim 1, wherein when the reader device is provided in an operating device and the operating device is door operating device for opening and closing a door, the first request information includes at least one of opening request information for the door and closing request information for the door.

14. The sub-reader device of claim 1, wherein when the reader device is provided in an operating device and the operating device is operation mode activation device for activating operation mode, the first request information includes at least one of activation request information for the operation mode and deactivation request information for the operation mode.

15. The sub-reader device of claim 1, wherein the sub-reader device communicates directly or indirectly with the server.

16. The sub-reader device of claim 1, wherein the sub-reader device communicates periodically or aperiodically with the server.

17. The sub-reader device of claim 1, wherein power required for operation of the sub-reader device is obtained from at least one of a radio frequency (RF) signal transmitted from the reader device and light provided from outside.

18. The sub-reader device of claim 17, wherein power required for communication between the sub-reader device and the first device in the sub-reader device is obtained based on a radio frequency (RF) signal provided from the reader device, and wherein the radio frequency (RF) signal is generated by the reader device based on communication between the reader device and the second device.

19. The sub-reader device of claim 1, wherein the authenticating the first request information based on the first information comprises decrypting the first request information based on the first information.

20. The sub-reader device of claim 1, wherein the sub-reader device communicates with the server for obtaining the first information.

21. A method of controlling a sub-reader device communicating with a reader device such that the reader device communicating using first communication protocol communicates with first device communicating using second communication protocol different from the first communication protocol via the sub-reader device, wherein the second communication protocol is not supported by the reader device, the method comprising:
  obtaining first request information using the second communication protocol from the first device;
  obtaining second request information based on the first request information; and
  providing the second request information to the reader device using the first communication protocol,
  wherein the sub-reader device authenticates the first request information based on the first information,
  wherein the first information is obtained from a server or pre-stored in the sub-reader device,
  wherein the second request information is provided to the reader device when the first request information is authenticated, and
  wherein the sub-reader device obtains the first request information when the first device receives information related to the first request information from the server.

22. A non-transitory recording medium on which a program is recorded for executing the method of claim 21.

* * * * *